US012581559B2

(12) United States Patent
Wang et al.

(10) Patent No.: US 12,581,559 B2
(45) Date of Patent: Mar. 17, 2026

(54) REPEATER ASSOCIATION FOR SIDELINK

(71) Applicant: QUALCOMM Incorporated, San Diego, CA (US)

(72) Inventors: Xiaojie Wang, Hillsborough, NJ (US); Navid Abedini, Basking Ridge, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 548 days.

(21) Appl. No.: 18/081,484

(22) Filed: Dec. 14, 2022

(65) Prior Publication Data

US 2024/0205992 A1    Jun. 20, 2024

(51) Int. Cl.
H04W 76/15 (2018.01)
H04W 76/14 (2018.01)
H04W 72/20 (2023.01)
H04W 72/232 (2023.01)

(52) U.S. Cl.
CPC .......... H04W 76/15 (2018.02); H04W 76/14 (2018.02); H04W 72/20 (2023.01); H04W 72/232 (2023.01)

(58) Field of Classification Search
CPC ..... H04W 76/14; H04W 76/15; H04W 76/30; H04W 72/232; H04W 72/20
USPC ........................................................ 370/329
See application file for complete search history.

(56) References Cited

U.S. PATENT DOCUMENTS

| | | | | |
|---|---|---|---|---|
| 2020/0322939 A1* | 10/2020 | Cao | ......................... | H04W 72/02 |
| 2023/0189389 A1* | 6/2023 | Hui | ........................ | H04L 1/1812 |
| | | | | 370/329 |
| 2023/0254832 A1* | 8/2023 | Sen | ........................ | H04L 5/0051 |
| | | | | 370/329 |
| 2023/0269799 A1* | 8/2023 | Cai | ........................ | H04W 72/40 |
| | | | | 370/329 |
| 2024/0121698 A1* | 4/2024 | Van Phan | ............. | H04L 1/1854 |
| 2024/0205046 A1* | 6/2024 | Löhr | ..................... | H04W 24/04 |
| 2024/0429994 A1* | 12/2024 | Moon | .................. | H04B 7/0456 |
| 2025/0056303 A1* | 2/2025 | Kang | ..................... | H04W 76/14 |
| 2025/0063622 A1* | 2/2025 | Zhang | ................... | H04W 76/30 |

FOREIGN PATENT DOCUMENTS

KR    10-2021-0183957    * 12/2021

* cited by examiner

*Primary Examiner* — Jungwon Chang
(74) *Attorney, Agent, or Firm* — Holland & Hart LLP

(57) ABSTRACT

An assisting node receives from a network entity, configuration information relating to one or more control data sets, the one or more control data sets comprising information relating to a plurality of sidelink (SL) nodes. The AN provides a relay sidelink (SL) link via the assisting node between a transmitting (Tx) SL node and a receiving (Rx) SL node of at least one pair of SL nodes from the plurality of SL nodes. The at least one pair of SL nodes is based at least in part on the configuration information.

30 Claims, 20 Drawing Sheets

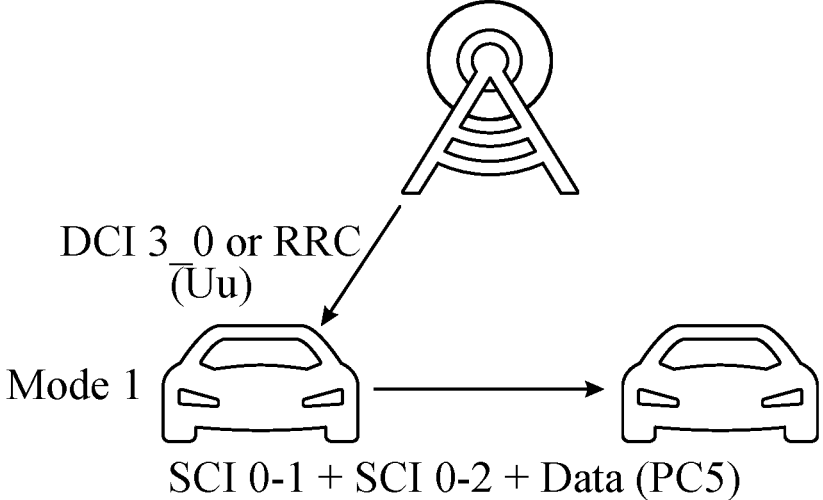
Mode 1
DCI 3_0 or RRC (Uu)
SCI 0-1 + SCI 0-2 + Data (PC5)
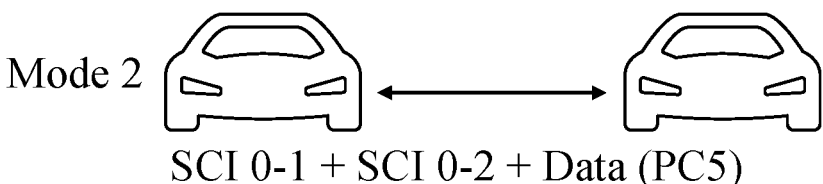
Mode 2
SCI 0-1 + SCI 0-2 + Data (PC5)
FIG. 7

Figure 11:
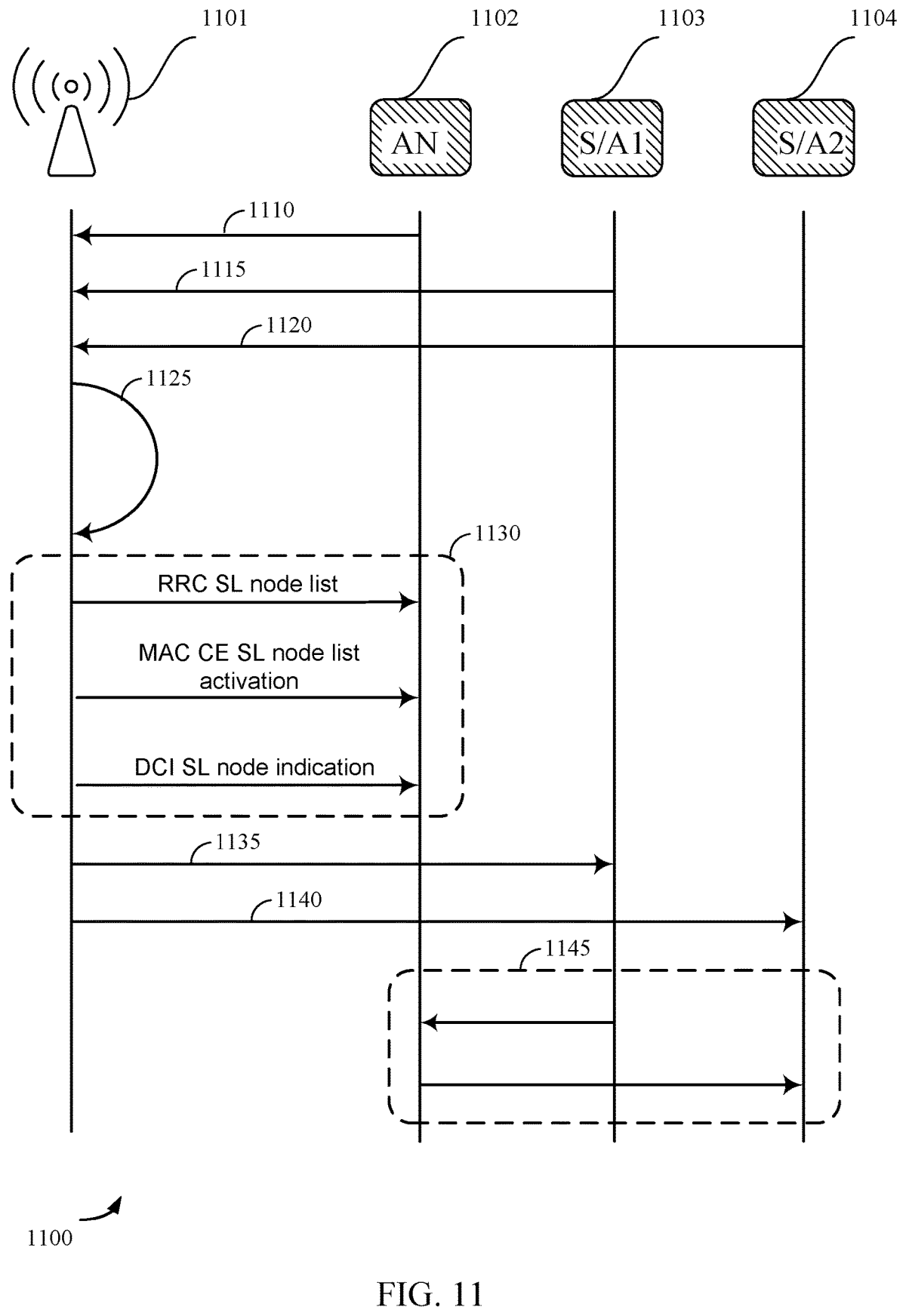

1101    1102    1103    1104

AN    S/A1    S/A2

1110

1115

1120

1125

1130

RRC SL node list

MAC CE SL node list activation

DCI SL node indication

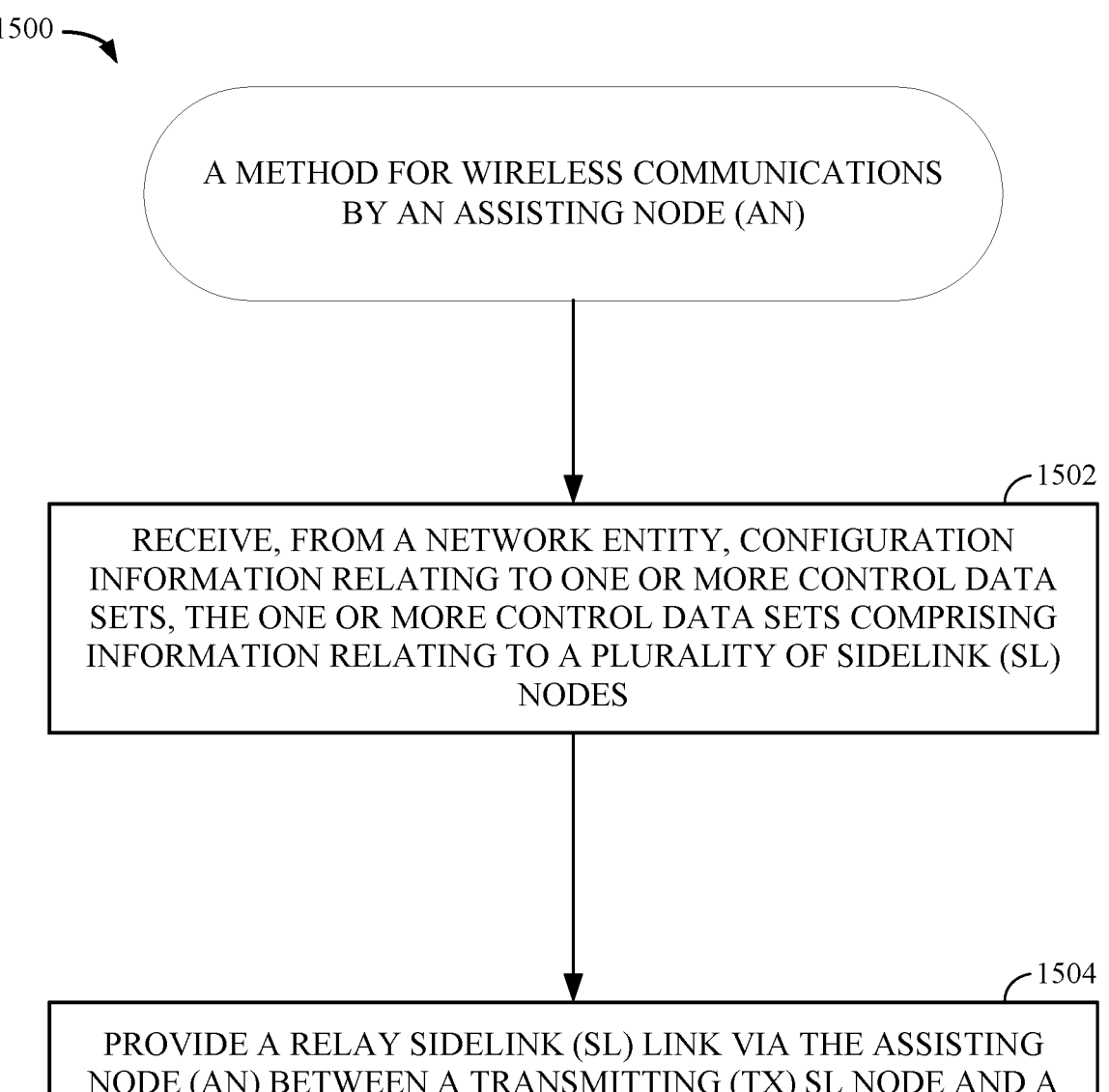

A METHOD FOR WIRELESS COMMUNICATIONS
BY AN ASSISTING NODE (AN)

1502

RECEIVE, FROM A NETWORK ENTITY, CONFIGURATION
INFORMATION RELATING TO ONE OR MORE CONTROL DATA
SETS, THE ONE OR MORE CONTROL DATA SETS COMPRISING
INFORMATION RELATING TO A PLURALITY OF SIDELINK (SL)
NODES

1504

PROVIDE A RELAY SIDELINK (SL) LINK VIA THE ASSISTING
NODE (AN) BETWEEN A TRANSMITTING (TX) SL NODE AND A
RECEIVING (RX) SL NODE OF AT LEAST ONE PAIR OF SL NODES
FROM THE PLURALITY OF SL NODES, THE AT LEAST ONE PAIR
OF SL NODES BEING BASED AT LEAST IN PART ON THE
CONFIGURATION INFORMATION

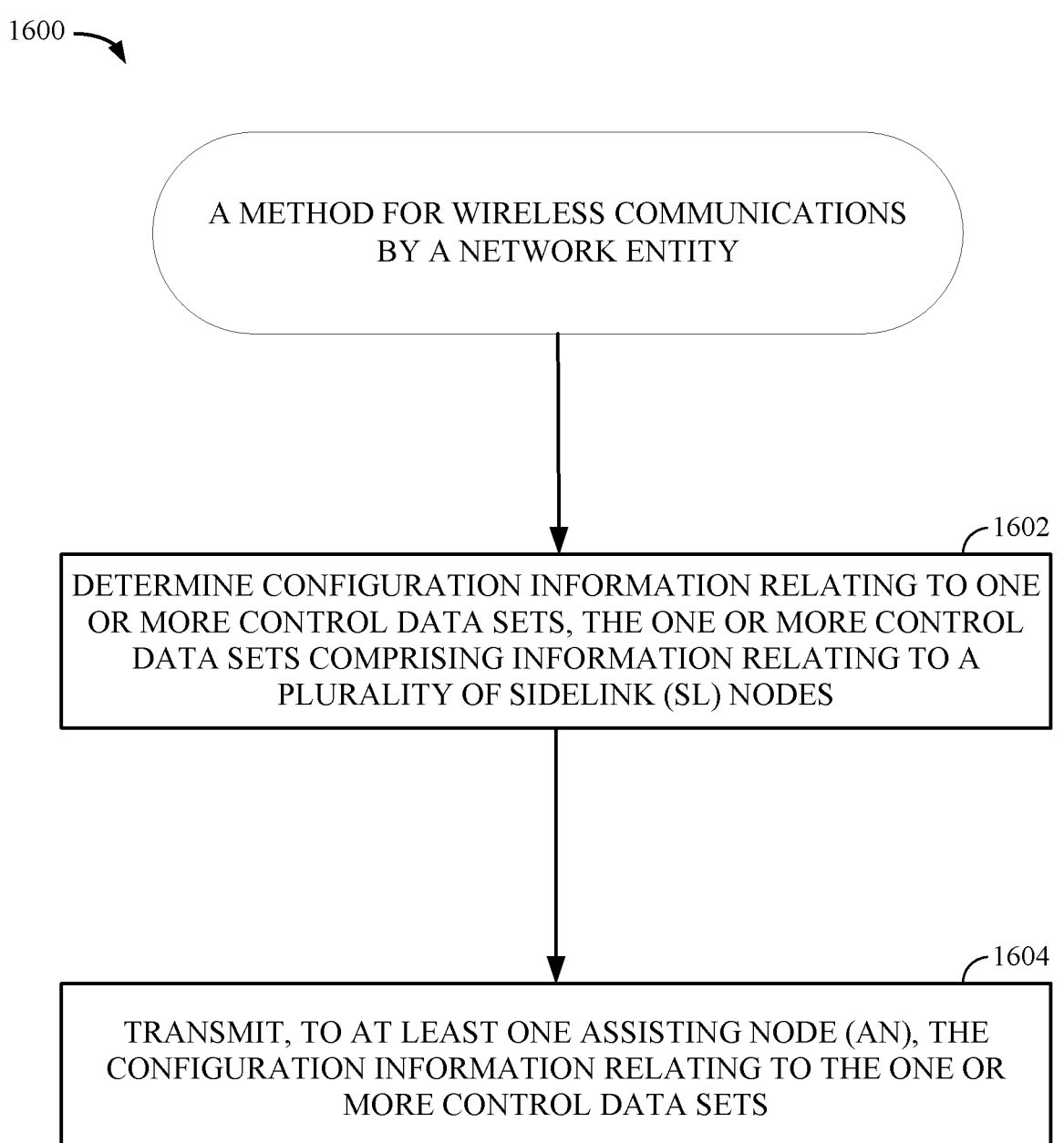

A METHOD FOR WIRELESS COMMUNICATIONS
BY A NETWORK ENTITY

1602

DETERMINE CONFIGURATION INFORMATION RELATING TO ONE
OR MORE CONTROL DATA SETS, THE ONE OR MORE CONTROL
DATA SETS COMPRISING INFORMATION RELATING TO A
PLURALITY OF SIDELINK (SL) NODES

1604

TRANSMIT, TO AT LEAST ONE ASSISTING NODE (AN), THE
CONFIGURATION INFORMATION RELATING TO THE ONE OR
MORE CONTROL DATA SETS

FIG. 16

1700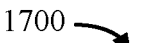
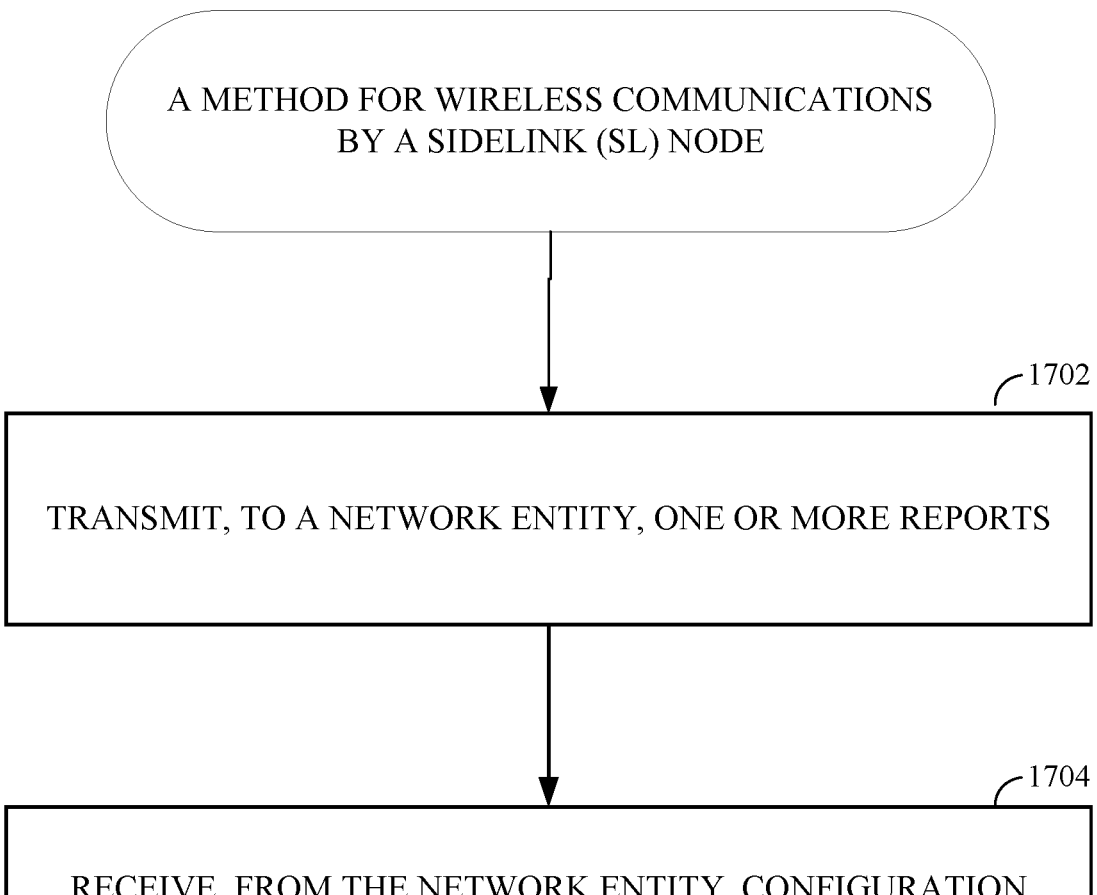
A METHOD FOR WIRELESS COMMUNICATIONS
BY A SIDELINK (SL) NODE
1702
TRANSMIT, TO A NETWORK ENTITY, ONE OR MORE REPORTS
1704
RECEIVE, FROM THE NETWORK ENTITY, CONFIGURATION
INFORMATION BASED AT LEAST IN PART ON THE ONE OR MORE
REPORTS
FIG. 17

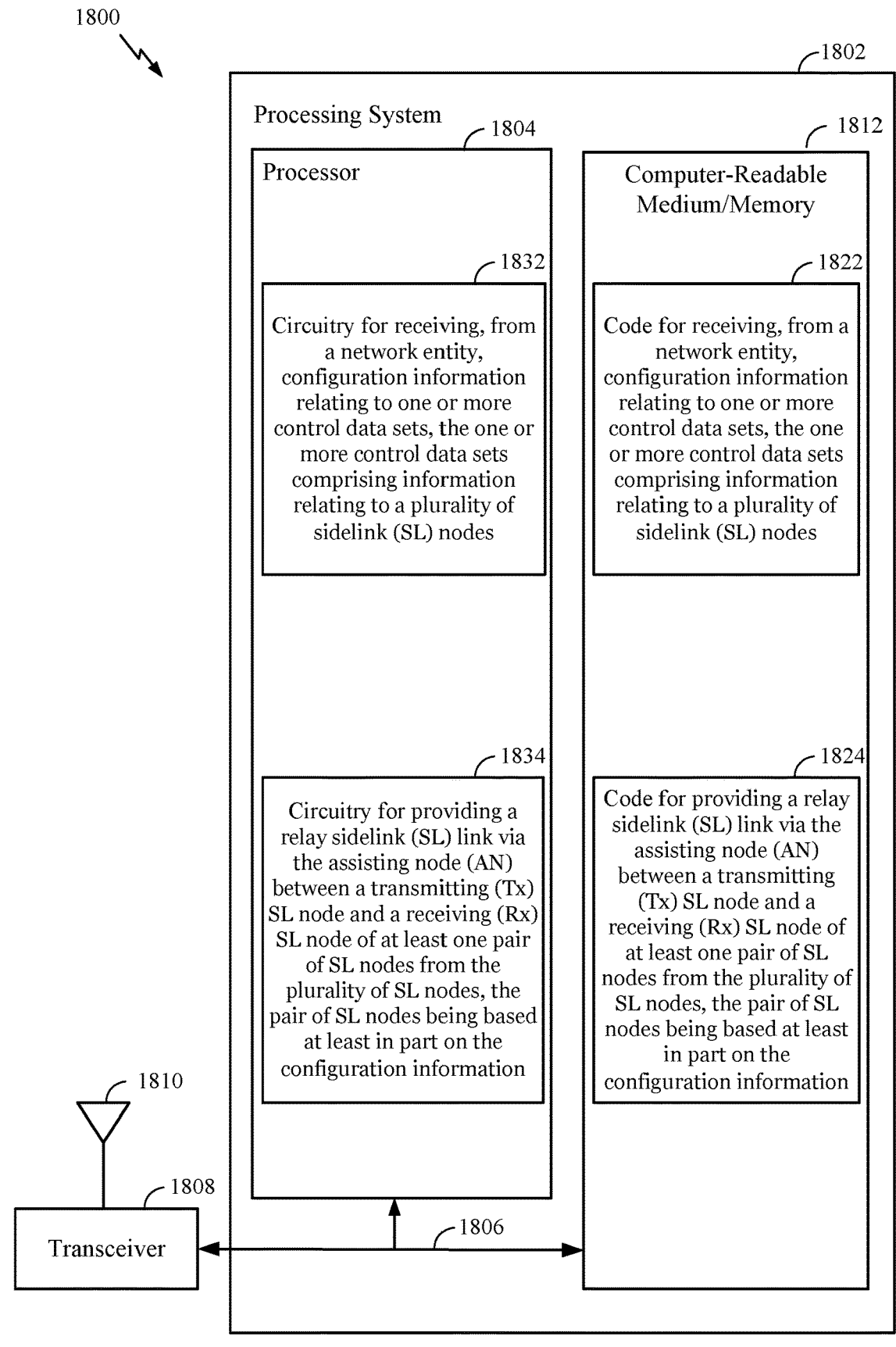

1800

1802

Processing System

1804

Processor

1832

Circuitry for receiving, from a network entity, configuration information relating to one or more control data sets, the one or more control data sets comprising information relating to a plurality of sidelink (SL) nodes

1834

Circuitry for providing a relay sidelink (SL) link via the assisting node (AN) between a transmitting (Tx) SL node and a receiving (Rx) SL node of at least one pair of SL nodes from the plurality of SL nodes, the pair of SL nodes being based at least in part on the configuration information

1812

Computer-Readable Medium/Memory

1822

Code for receiving, from a network entity, configuration information relating to one or more control data sets, the one or more control data sets comprising information relating to a plurality of sidelink (SL) nodes

1824

Code for providing a relay sidelink (SL) link via the assisting node (AN) between a transmitting (Tx) SL node and a receiving (Rx) SL node of at least one pair of SL nodes from the plurality of SL nodes, the pair of SL nodes being based at least in part on the configuration information

1810

1808

Transceiver

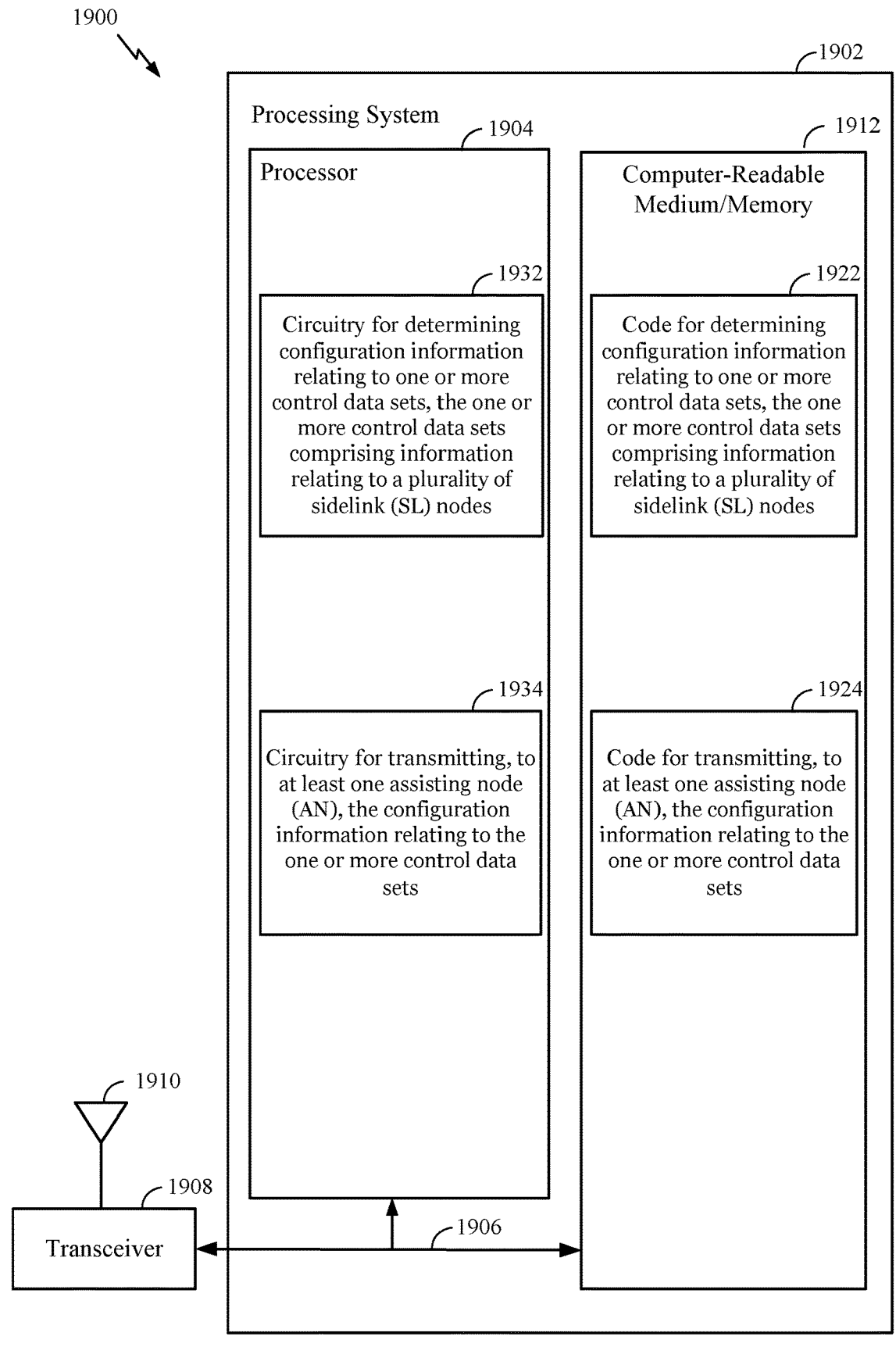

Processing System

1904

Processor

1932

Circuitry for determining configuration information relating to one or more control data sets, the one or more control data sets comprising information relating to a plurality of sidelink (SL) nodes

1934

Circuitry for transmitting, to at least one assisting node (AN), the configuration information relating to the one or more control data sets

1912

Computer-Readable Medium/Memory

1922

Code for determining configuration information relating to one or more control data sets, the one or more control data sets comprising information relating to a plurality of sidelink (SL) nodes

1924

Code for transmitting, to at least one assisting node (AN), the configuration information relating to the one or more control data sets

1910

1908

Transceiver

REPEATER ASSOCIATION FOR SIDELINK

FIELD OF THE DISCLOSURE

Aspects of the present disclosure relate to wireless communications, and more particularly, to device-to-device sidelink communications.

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

Sidelink communications generally refer to communications between devices (e.g., sidelink (SL) nodes, UEs). As the demand for mobile broadband access continues to increase, the demand for improvements to sidelink communications increases as well.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description" one will understand how the features of this disclosure provide advantages that include improved device-to-device communications in a wireless network.

Certain aspects of this disclosure provide a method for wireless communication by an assisting node (AN), comprising: receiving, from a network entity, configuration information relating to one or more control data sets, the one or more control data sets comprising information relating to a plurality of sidelink (SL) nodes; and providing a relay sidelink (SL) link via the assisting node (AN) between a transmitting (Tx) SL node and a receiving (Rx) SL node of at least one pair of SL nodes from the plurality of SL nodes, the at least one pair of SL nodes being based at least in part on the configuration information.

Certain aspects of this disclosure provide an assisting node (AN) comprising: at least one processor; at least one memory module coupled to the at least one processor; and instructions stored in the at least one memory module and executable by the at least one processor to cause the apparatus to: receive, from a network entity, configuration information relating to one or more control data sets, the one or more control data sets comprising information relating to a plurality of sidelink (SL) nodes; and provide a relay sidelink (SL) link via the assisting node (AN) between a transmitting (Tx) SL node and a receiving (Rx) SL node of at least one pair of SL nodes from the plurality of SL nodes, the at least one pair of SL nodes being based at least in part on the configuration information.

Certain aspects of this disclosure provide a method for wireless communications by a network entity (e.g., a base station, such as a gNB, a programmable logical controller (PLC), etc.). The method generally comprises determining configuration information relating to one or more control data sets, the one or more control data sets comprising information relating to a plurality of sidelink (SL) nodes; and transmitting, to at least one assisting node (AN), the configuration information relating to the one or more control data sets.

Certain aspects of this disclosure provide a method for wireless communications by a sidelink (SL) node. The method generally comprises transmitting, to a network entity, one or more reports; and receiving, from the network entity, configuration information based at least in part on the one or more reports.

The disclosure also relates to the apparatuses or computer programs configured for carrying out any of the methods according to the disclosure. To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 7 illustrates two modes of sidelink (SL) communication.

FIG. 11 illustrates example operations where a network entity (e.g., gNB, PLC) may associate an assisting node (AN) with at least one pair of sidelink (SL) nodes for efficient repeating scheduling, in accordance with certain aspects of the present disclosure.

FIG. 15 shows a flowchart illustrating a first aspect of a method for wireless communications by an assisting node (AN), in accordance with certain aspects of the present disclosure.

FIG. 16 shows a flowchart illustrating a first aspect of a method for wireless communications by a network entity (e.g., gNB, PLC), in accordance with certain aspects of the present disclosure.

FIG. 17 shows a flowchart illustrating a first aspect of a method for wireless communications by a sidelink (SL) node, in accordance with certain aspects of the present disclosure.

FIG. 18 illustrates an apparatus for wireless communication at a associating node (AN) in accordance with various aspects of the present disclosure, in accordance with certain aspects of the present disclosure.

FIG. 19 illustrates an apparatus 1900 for wireless communication at a network entity (e.g., gNB, PLC), in accordance with certain aspects of the present disclosure.

Figure 1:
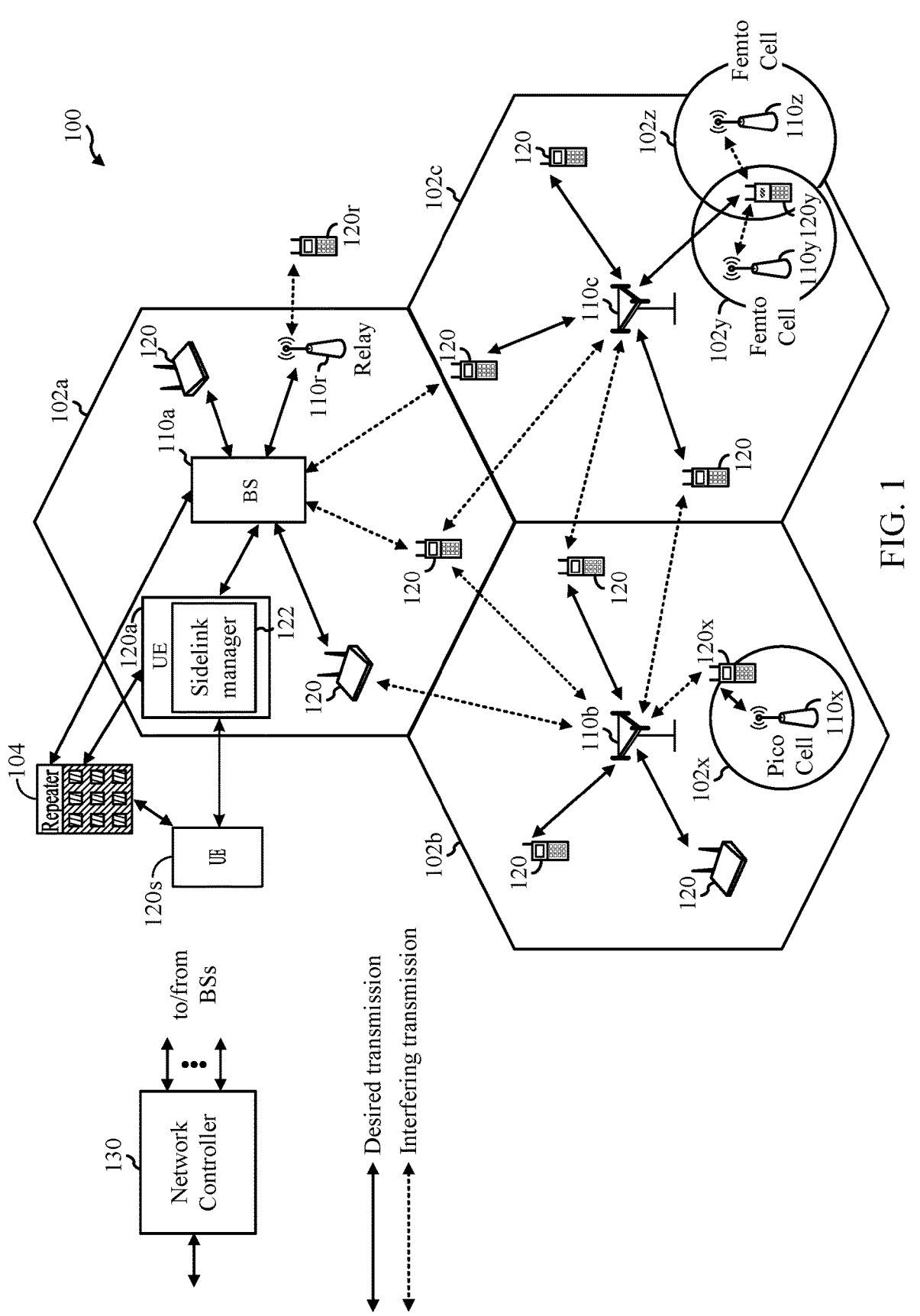
FIG. 1 is a block diagram conceptually illustrating an example telecommunications system, in accordance with certain aspects of the present disclosure.
Figure 4:
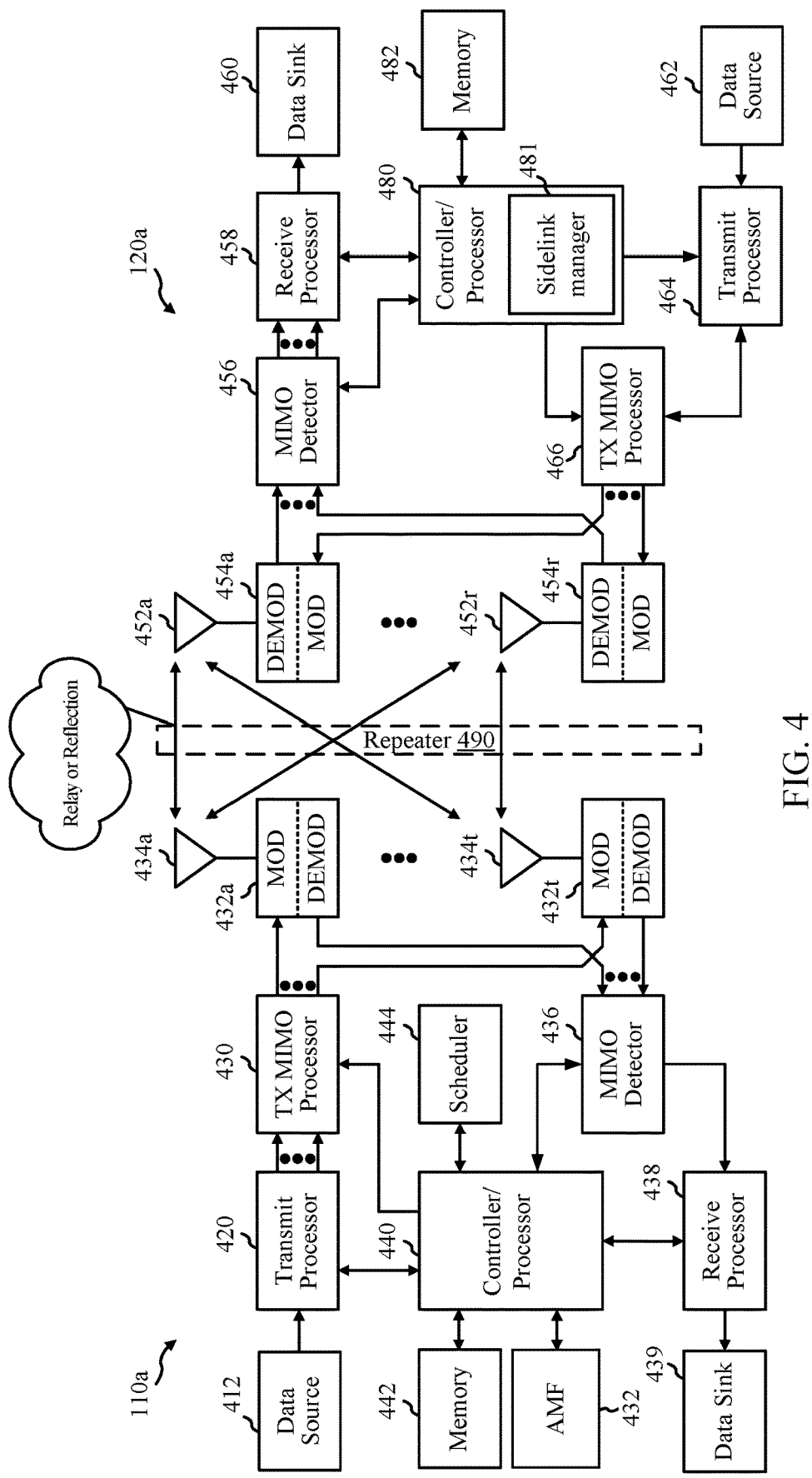
FIG. 4 is a block diagram conceptually illustrating a design of an example base station (BS) and user equipment (UE), in accordance with certain aspects of the present disclosure.

To facilitate understanding, in some examples identical reference numerals have been used, where appropriate, to designate identical elements that are common to the figures (e.g., base station 110a and UE 120a in FIGS. 1 and 4). It is contemplated that elements disclosed in one aspect may be beneficially utilized on other aspects without specific recitation.

DETAILED DESCRIPTION

Aspects of the present disclosure provide apparatus, methods, processing systems, and computer readable mediums for sidelink (SL) communications. For example, according to certain aspects an assisting node (AN) (e.g., a smart repeater, a relay, or a reflector) may be configured to participate in repeating operations to enhance sidelink (SL) communication reliability. For example, one or more assisting nodes (ANs) may be configured by a network entity (e.g., a base station, such as a gNB, a programmable logical controller (PLC), or any TRP) for repeating/relaying sidelink (SL) communications between two or more sidelink (SL) nodes (e.g., user equipments (UEs), sensors/actuators (S/As), etc.), wherein the two or more SL nodes communicate with one another via the one or more assisting nodes (ANs), i.e., without the communications among the SL nodes going through the network entity. Hence, an assisting node may also be referred to as a sidelink repeater, a sidelink relay, and the like.

In some cases, the assisting node (AN) may comprise a (sidelink) relay or a (sidelink) reflector, such as a reconfigurable intelligent surface (RIS). The (sidelink) relay or (sidelink) reflector may actively (e.g., powered and with signal amplification) or passively (e.g., without additional power or amplification) provide a second channel between sidelink nodes of the same type (e.g., UEs, S/As, etc.), or between sidelink nodes of different types, such as a UE and a transmit-receive point (TRP). Hereinafter, the term "assisting node" (AN) may be used interchangeably with the term "repeater" (or "sidelink repeater") that may refer to both active and passive types of relays or reflectors.

Throughout this disclosure, the term "UE" may be used interchangeably with the term "sidelink node" (wherein a "sidelink node" may be one of a plurality of sensor(s) and/or actuator(s) (S/As) controlled by a programmable logical controller (PLC)).

In general, a UE or in some cases a network entity (e.g., a base station, such as a gNB, a programmable logical controller (PLC), or any TRP) may communicate with another UE via a repeater, meaning transmissions from the network entity are relayed or reflected by the repeater to the UE. In some cases, both the network entity and the UE may be configured to perform beamforming with the repeater. For example, in additional to the existing beamforming configuration between the network entity and the UE, each of the network entity and the UE may separately perform beam training with the repeater to establish a separate signal path.

In order to improve sidelink reliability, the repeater may be configured to repeat sidelink communications (e.g., activation, resource allocation, and beamforming, etc.) and associated with one or more of a plurality of sidelink nodes or links. Certain aspects of the present disclosure relate to various techniques, apparatuses and computer programs for repeater association for sidelink. For example, in a setting of industrial internet of things (IIoT), numerous programmable logical controllers (PLCs)—also known as programmable logic controllers—may communicate with many sensors and/or actuators (S/As) with low latency yet high reliability requirements. Both PLCs and S/As may communicate with each other via sidelink communications (e.g., PC5 interface). However, such direct sidelink communications may be disrupted. Therefore, the assisting nodes and techniques disclosed herein provide an alternative signal path (e.g., with PC5 interface capabilities) and repeating operations between the PLCs and S/As, which may help improve reliability and overall system performance.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration". Any aspect described herein as "exemplary" is not necessarily to be construed as preferred or advantageous over other aspects.

Some of the techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). Some of the techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

FIG. 1 illustrates an example wireless communication network 100 in which aspects of the present disclosure may be performed. The wireless communication network 100 may comprise one or more UEs 120, including one or more sidelink nodes, e.g., UEs 120s. A repeater 104 (e.g., assisting node) may assist communications in both Uu and PC5 interfaces. In other words, the repeater 104 (e.g., assisting node) may function both as a downlink/uplink (DL/UL) relay via the Uu interface and as a sidelink (SL) relay via the PC5 interface. The assisting node (e.g., repeater 104) may be operable to perform a method 1500 described below with reference to FIG. 15. A network entity, such as a base station (BS) 110*a* (e.g., gNB) may be operable to perform a method 1600 described below with reference to FIG. 16. One or more sidelink nodes (e.g., UEs 120s) may be configured to perform a method 1700 described below with reference to FIG. 17.

As illustrated in FIG. 1, the wireless communication network 100 may comprise a number of base stations (BSs) 110*a-z* (each also individually referred to herein as BS 110 or collectively as BSs 110) and other network entities. In aspects of the present disclosure, a roadside service unit (RSU) may be considered a type of BS, and a BS 110 may be referred to as an RSU. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the UEs 120 may be configured to establish direct sidelink communications with another UE, such as the UE 120s (e.g., sidelink nodes). As shown in FIG. 1, the UE 120a includes a sidelink manager 122. The sidelink manager 122 may be configured to transmit a sidelink communication to the UE 120s, in accordance with aspects of the present disclosure. Furthermore, the UEs 120a and 120s may utilize the sidelink repeating operations provided by the repeater 104. For example, the repeater 104, when activated, repeats the sidelink transmissions between the UEs 120a and 120s, such as when the direct sidelink therebetween is disrupted or blocked.

For example, communication between the UEs 120a and 120s may be blocked by obstacles and use assistance from the repeater 104, which may be a reconfigurable intelligent surface (RIS). The repeater 104 may re-radiate (e.g., reflect or refract) transmissions in an alternate signal path. In some cases, the repeater 104 may be configured with a trained beamforming configuration to allow a beam from one of the UEs 120a and 120s to be re-radiated off the repeater 104 to reach the other. The direction of the re-radiation by the repeater 104 may be controlled or reconfigured by the BS 110a or a controller. The BS 110a may also provide indications of available sidelink resources between the UEs 102a and 102s.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices. In some aspects, an assisting node (AN) may be referred to as a (sidelink) repeater and/or a (sidelink) relay when providing an alternate signal path via the assisting node between two or more (sidelink) nodes (e.g., UEs 120).

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
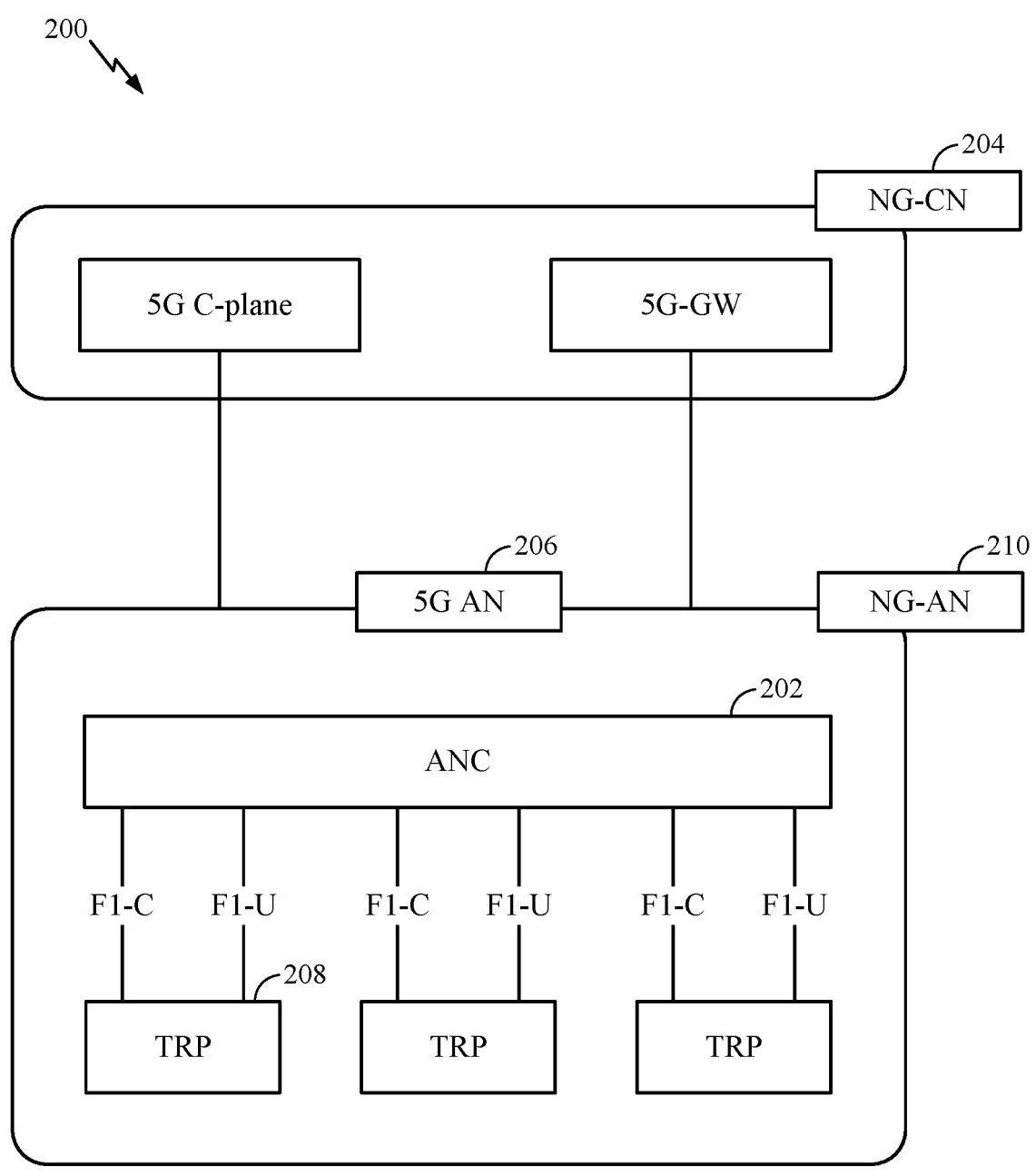
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. The Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
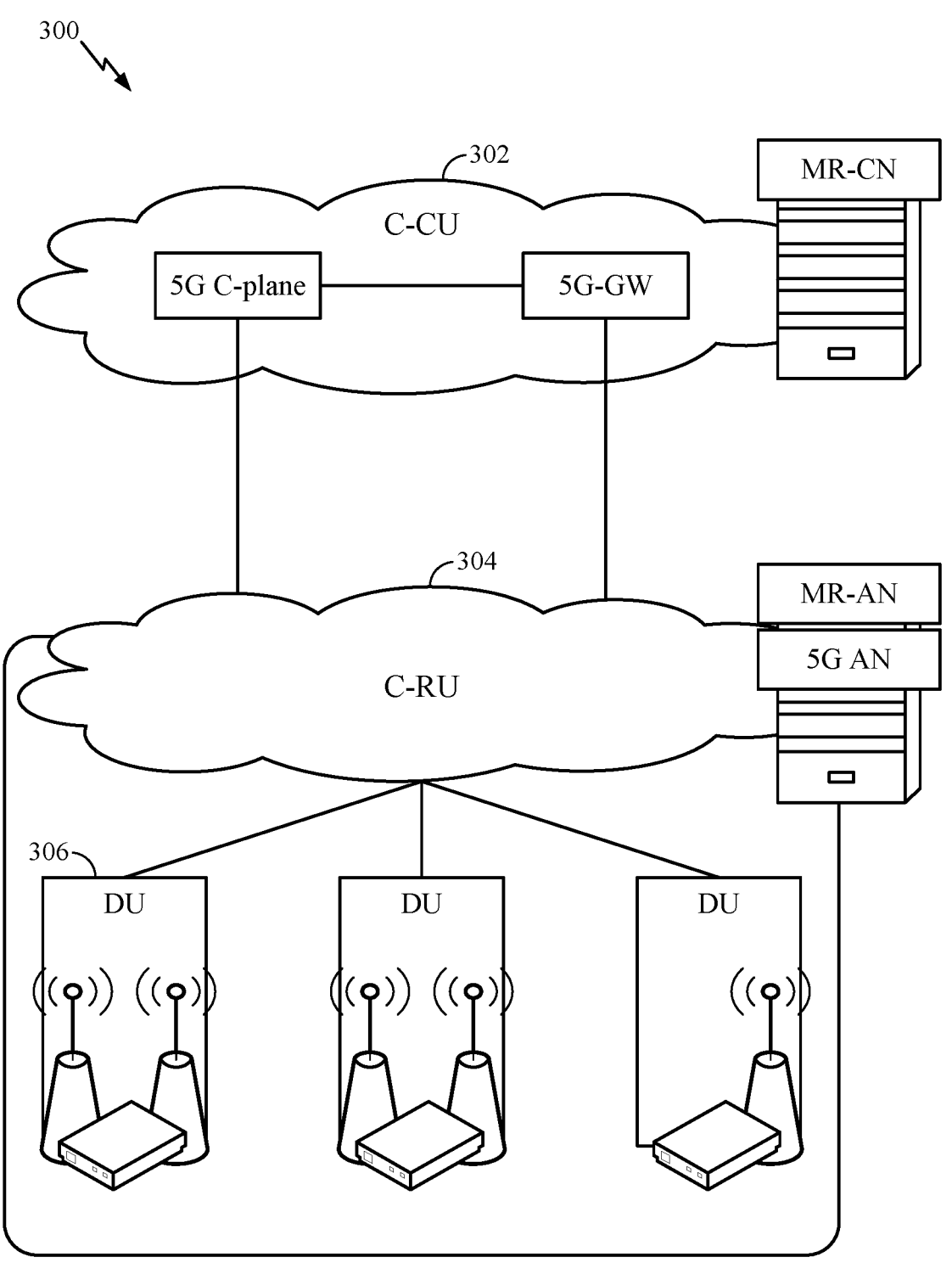
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

FIG. 4 illustrates example components of BS 110a and UE 120a (as depicted in FIG. 1), which may be used to implement aspects of the present disclosure. The repeater 490 as shown may re-radiate signals between the BS 110a and UE 120a, in addition to re-radiating signals between the UEs 120a and UEs 120s as discussed in relation to FIG. 1. For example, the repeater 490 may be used to perform the various techniques and methods described herein with reference to FIG. 15, so that the repeater 490 may be an example of assisting node (AN). The antennas 434, processors 430, 438, 420, and/or controller/processor 440 of the BS 110a may be used to perform the various techniques and methods described herein with reference to FIG. 16, so that the BS 110a may be an example of a network entity. The antennas 452, processors 466, 458, 464, and/or controller/processor 480 of the UE 120a (and, correspondingly, of the UE 120s) may be used to perform the various techniques and methods described herein with reference to FIG. 17, so that the UEs 120a, 120s may be examples of sidelink nodes.

In some cases, the repeater 490 may be configured, reconfigured, or controlled by the BS 110a or a controller (not shown) for sidelink association, as illustrated, for example, in FIG. 11. Each antenna element on the repeater 490 may re-radiate radio signals with certain phase or amplitude changes, such as phase shifts. The BS 110a or controller may reconfigure the phase or amplitude changes by applying a precoding weight to each antenna element to enable the repeater 490 to re-radiate an output beam at different directions given a particular input beam. Therefore, the repeater 490 may be configured with specific beamforming properties with respect to each of the UEs 120a, 120s, and the BS 110a.

At the BS 110a, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC-PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120a, the antennas 452a through 452r may receive the downlink signals from the base station 110a and may provide received signals to the demodulators (DE-MODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120a to a data sink 460, and provide decoded control information to a controller/processor 480.

On the uplink, at UE 120a, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110a. At the BS 110a, the uplink signals from the UE 120a may be received by the antennas 434, processed by the modulators 432, detected by a MIMO detector 436 if applicable, and further processed by a receive processor 438 to obtain decoded data and control information sent by the UE 120a. The receive processor 438 may provide the decoded data to a data sink 439 and the decoded control information to the controller/processor 440.

The controllers/processors 440 and 480 may direct the operation at the BS 110a and the UE 120a, respectively. The processor 440 and/or other processors and modules at the BS 110a may perform or direct the execution of processes for the techniques described herein. As shown in FIG. 2, the controller/processor 480 of the UE 120a has a sidelink manager 481 that may be configured for transmitting a sidelink communication to another UE. Although shown at the controller/processor 480 and controller/processor 440, other components of the UE 120a and BS 110a may be used performing the operations described herein. The memories 442 and 482 may store data and program codes for BS 110a and UE 120a, respectively. A scheduler 444 may schedule UEs for data transmission on the downlink, sidelink, and/or uplink.

In some circumstances, two or more subordinate entities (e.g., UEs) may communicate with each other using "sidelink signals", and they may be referred to as "sidelink nodes". Generally, a "sidelink signal" may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks (WLANs), which typically use an unlicensed spectrum). Correspondingly, a "sidelink" may refer to the direct link between the one subordinate entity (e.g., UE1) and the other subordinate entity (e.g., UE2). As such, a "sidelink" may be used to transmit and receive a communication (e.g., "sidelink signal"). Real-world applications of sidelink communications may include public safety, proximity services, UE-to-network relaying, vehicle-to-vehicle (V2V) communications, Internet of Everything (IoE) communications, Internet of Things (IoT) and Industrial IoT (IIoT) communications, mission-critical mesh, and/or various other suitable applications.

Figures 5A, 5B:
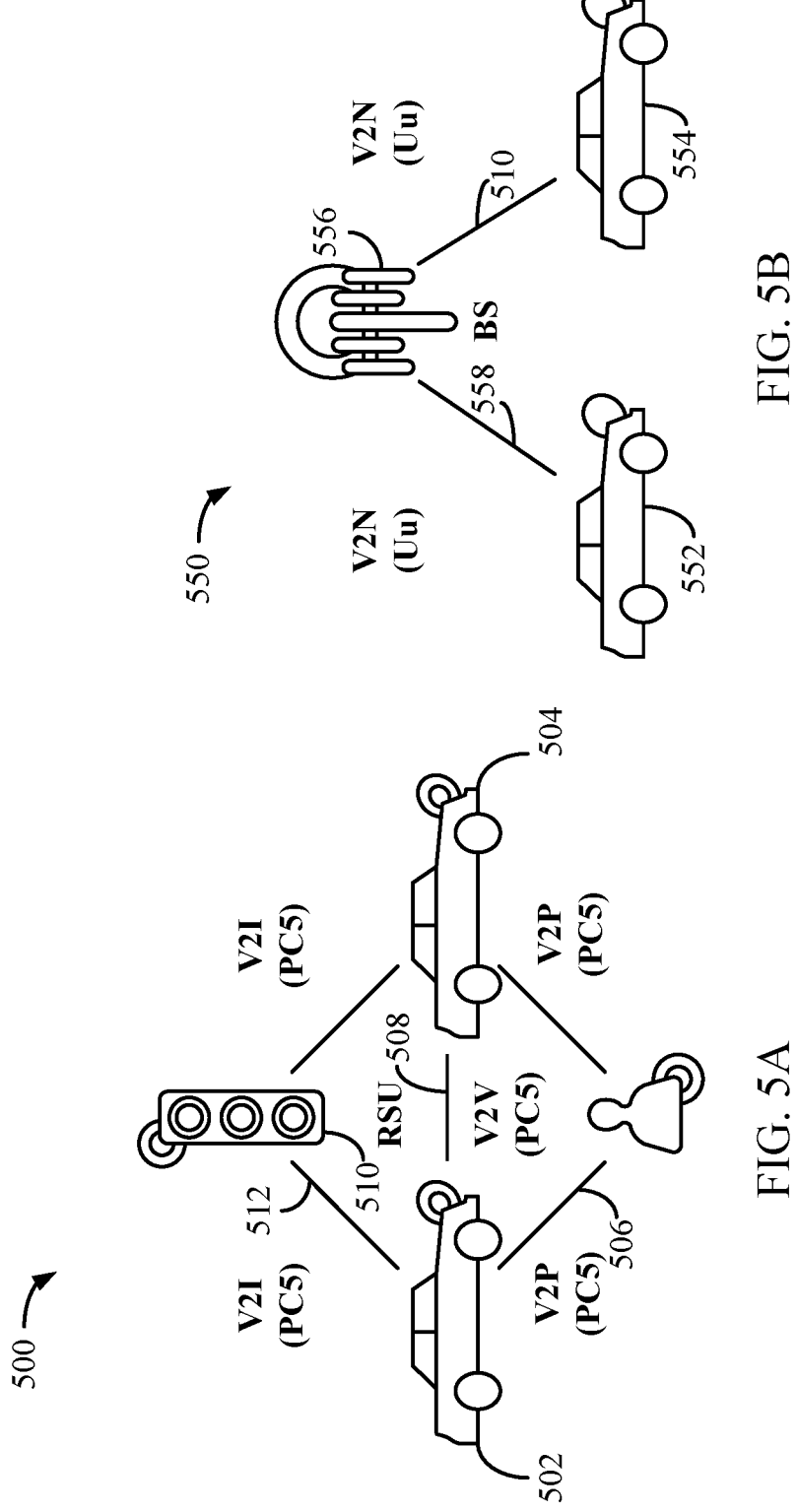
FIGS. 5A and 5B show diagrammatic representations of example vehicle to everything (V2X) systems in accordance with some aspects of the present disclosure.

FIGS. 5A and 5B show diagrammatic representations of example vehicle to everything (V2X) systems in accordance with some related aspects of the present disclosure. For example, the vehicles shown in FIGS. 5A and 5B may communicate via sidelink channels and may perform sidelink CSI reporting as described herein. The V2X systems, provided in FIGS. 5A and 5B provide two complementary transmission modes. A first transmission mode, shown by way of example in FIG. 5A, involves direct communications (e.g., over a PC5 interface), also referred to as sidelink communications, between participants in proximity to one another in a local area. A second transmission mode, shown by way of example in FIG. 5B, involves network communications through a network, which may be implemented over a Uu interface (i.e., a wireless communication interface between a radio access network (RAN) and a UE).

Referring to FIG. 5A, a V2X system 500 (e.g., including vehicle-to-vehicle (V2V) communications) is illustrated with two vehicles 502, 504. The first transmission mode allows for direct communication between different participants in a given geographic location. As illustrated, a vehicle can have a wireless communication link 506 with an individual (i.e., vehicle to person (V2P), for example, via a UE) through a PC5 interface. Communications between the vehicles 502 and 504 may also occur through a PC5 interface 508. In a like manner, communication may occur from a vehicle 502 to other highway components (for example, roadside service unit 510), such as a traffic signal or sign (i.e., vehicle to infrastructure (V2I)) through a PC5 interface 512. With respect to each communication link illustrated in FIG. 5A, two-way communication may take place between elements, therefore, each element may be a transmitter and a receiver of information. The V2X system 500 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus, any vehicle with an equipped system may access a common frequency and share information. Such harmonized/common spectrum operations allow for safe and reliable operation.

FIG. 5B shows a V2X system 550 for communication between a vehicle 552 and a vehicle 554 through a network entity 556. These network communications may occur through discrete nodes, such as a base station (e.g., eNB or gNB), that sends and receives information to and from (e.g., relays information between) vehicles 552, 554. The network communications through vehicle to network (V2N) links 558 and 510 may be used for long-range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

In some circumstances, two or more subordinate entities (for example, UEs) may communicate with each other using sidelink signals. As described above, V2V and V2X communications are examples of communications that may be transmitted via a sidelink. When a UE is transmitting a sidelink communication on a sub-channel of a frequency band, the UE is typically unable to receive another communication (e.g., another sidelink communication from another UE) in the frequency band.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. For the operation regarding PSSCH, a UE may perform either transmission or reception in a slot on a carrier. A reservation or allocation of transmission resources for a sidelink transmission may be made on a sub-channel of a frequency band for a period of a slot. NR may support for a UE a case where all the symbols in a slot are available for sidelink, as well as another case where only a subset of consecutive symbols in a slot is available for sidelink. PSFCH may carry feedback such as channel state information (CSI) related to a sidelink channel quality. A sequence-based PSFCH format with one symbol (not including AGC training period) may be supported. The following formats may be possible: a PSFCH format based on PUCCH format 2 and a PSFCH format spanning all available symbols for sidelink in a slot.

Figure 6:
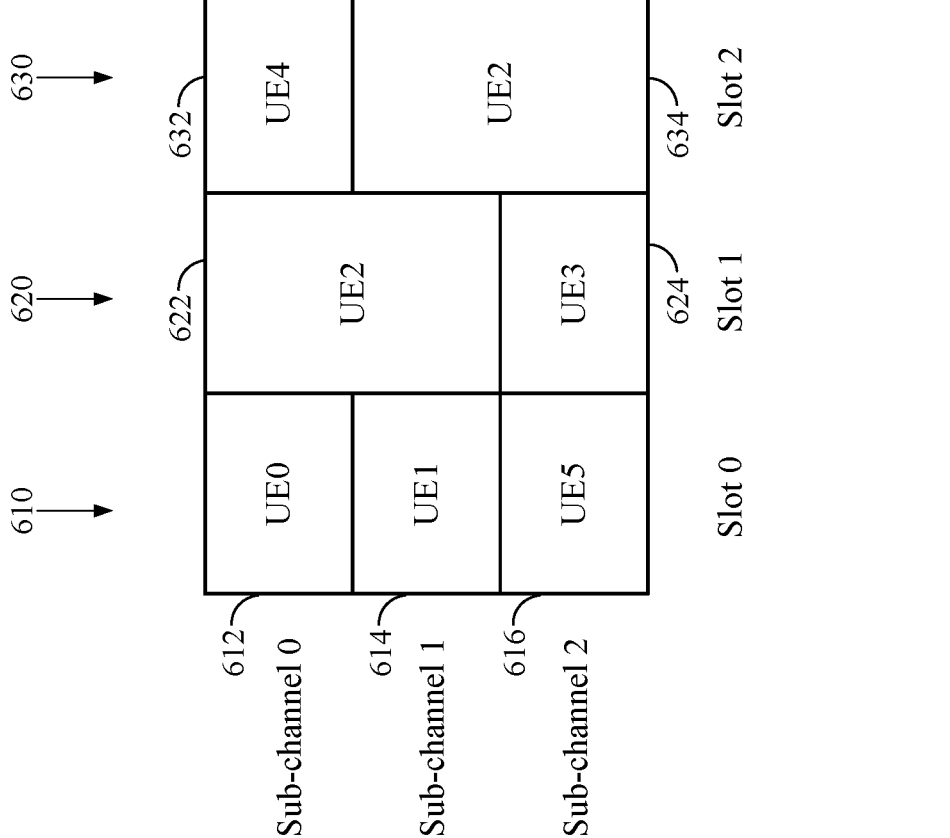
FIG. 6 illustrates an example allocation of a resource pool for sidelink (SL) communications, in accordance with certain aspects of the present disclosure.

FIG. 6 is an example of how resources of a common resource pool 600 may be allocated for sidelink communications (e.g., broadcast and groupcast device-to-device (D2D)) among several sidelink nodes, i.e., UEs 0-5 (e.g., UEs 110 shown in FIG. 1). The common resource pool 600 includes slots 610, 620, and 630 (also referred to as slots 0, 1, and 2). As noted above, with reference to FIGS. 5A and 5B, sidelink generally refers to the link between two users, or user-relays can be used in different scenarios and for different applications. As previously described, when a UE is transmitting a sidelink communication on a sub-channel of a frequency band, the UE is typically unable to receive another communication (e.g., another sidelink communication from another UE) in the frequency band. Thus, sidelink communications may be referred to as being half-duplex. As a result, the UEs 0, 1, and 5, which transmit sidelink communications 612, 614, and 616 respectively, cannot receive the sidelink communications from each other. That is, UE 0 cannot receive the sidelink transmissions 614 and 616. Similarly, UE 2 cannot receive the sidelink transmissions 624 and 632 from UEs 3 and 4, respectively. Also, UE 3 cannot receive sidelink transmission 622 from UE 2, and UE 4 cannot receive the sidelink transmission 634 from UE 2. In aspects of the present disclosure, a sidelink transmission(s) that cannot be received may be referred to as being "erased" for the UE or wireless node that cannot receive the sidelink transmission, because the UE has no information regarding that sidelink transmission. This is unlike other situations in which a UE fails to decode a transmission, because in those situations, the UE may retain some information regarding the transmission that the UE failed to decode, and the UE may combine that retained information with a retransmission that the UE receives to determine the transmission that the UE failed to decode.

Generally, resource allocation in NR sidelink communications is reservation-based. In these techniques, resource allocations are made in units of sub-channels in the frequency domain and are limited to one slot in the time domain. A transmission may reserve resources in the current slot and in up to two future slots. Reservation information may be carried in sidelink control information (SCI). In the previously known techniques, sidelink control information (SCI) may be transmitted in two stages. A first stage SCI (SCI-1) may be transmitted on a physical sidelink control channel (PSCCH) and contains resource reservation information as well as information to decode a second stage SCI (SCI-2). A SCI-2 may be transmitted on the physical sidelink shared channel (PSSCH) and contains information to decode data on the shared channel (SCH) and to provide feedback (e.g., acknowledgments (ACKs) or negative acknowledgments (NAKs)) over the physical sidelink feedback channel (PSFCH).

Example General Sidelink Control Operations

FIG. 7 illustrates two modes of sidelink communications (Mode 1 and Mode 2), which may be applicable to the sidelink communications between PLCs and S/As. In Mode 1, the sidelink resources are often scheduled by a gNB (e.g., via Uu interface as shown, by DCI 3_0 or RRC). In Mode 2, the UEs may autonomously select sidelink resources from a (pre)configured sidelink resource pool(s) based on the channel sensing mechanism (e.g., via PC5 interface as shown, by SCI 0-1 and/or 0-2). When at least one UE is in-coverage, a gNB may be configured to adopt Mode 1 or Mode 2. When the UEs are out of coverage, only Mode 2 may be adopted.

In Mode 1, the gNB may schedule sidelink resource(s) to be used by UE for sidelink transmission(s), for example, via dynamic grants (DG), type 1 configured grants (CG) type 1, and/or type w CGs. CG type 1 is activated via radio resource control (RRC) signaling from gNB. DG and CG type 2 are conveyed using downlink control information (DCI) format 3_0 over physical downlink control channel (PDCCH), as shown, for illustration, in FIG. 8. In some aspects, the DCI may be a DG and provide allocation to use over sidelink. The DCI can activate/deactivate a CG type 2 for sidelink. The UE may report activation/deactivation confirmation using MAC-CE. For example, the DCI format 3_0 may be used for scheduling of NR PSCCH and PSSCH in one cell. The DCI format 3_0 may include the following information: time gap, HARQ process ID, new data indicator, a lowest index of the subchannel allocation to the initial transmission.

In Mode 2, when traffic arrives at a transmitter UE, the transmitter UE may select resources for PSCCH and PSSCH, and/or reserve resources for retransmissions to minimize latency. Therefore, in conventional configurations the transmitter UE may select resources for PSSCH associated with PSCCH for initial transmission and blind retransmissions, which may incur unnecessary resources and the related power consumption. To avoid such resource waste and other similar resource duplication/blind reservation/redundancy, the UEs in sidelink communication may communicate to use a subset of the resources. For example, in Mode 2, the UE may determine, (i.e., not scheduled by the gNB) sidelink transmission resource(s) within the sidelink resources configured by the gNB/network (or pre-configured sidelink resources). In some cases, the transmitter UE may send PSCCH and PSSCH to the receiver UE. The receiver UE may respond by sending sidelink feedback PSFCH to the transmitter UE. In some aspects, the transmitter UE may sense and select resources based on SCI 0-1 messages and the reference signal received power (RSRP) measurements of demodulation reference signal (DMRS) inside PSSCH or PSCCH. In some examples, the transmitter UE may use SCI 0-1 or SCI 0-2 to schedule and transmit data through PSSCH.

According to some aspects of the present disclosure, the PLCs and S/As, as UEs, may operate in either Mode 1 or Mode 2, with PLCs benefiting more in Mode 1 than S/As, and S/As benefiting more in Mode 2 than PLCs. The assisting node (AN) therebetween may improve reliability in both modes. In particular, the assisting node may improve sidelink reliability by providing sidelink repeating operations in Mode 2.

Figure 8:
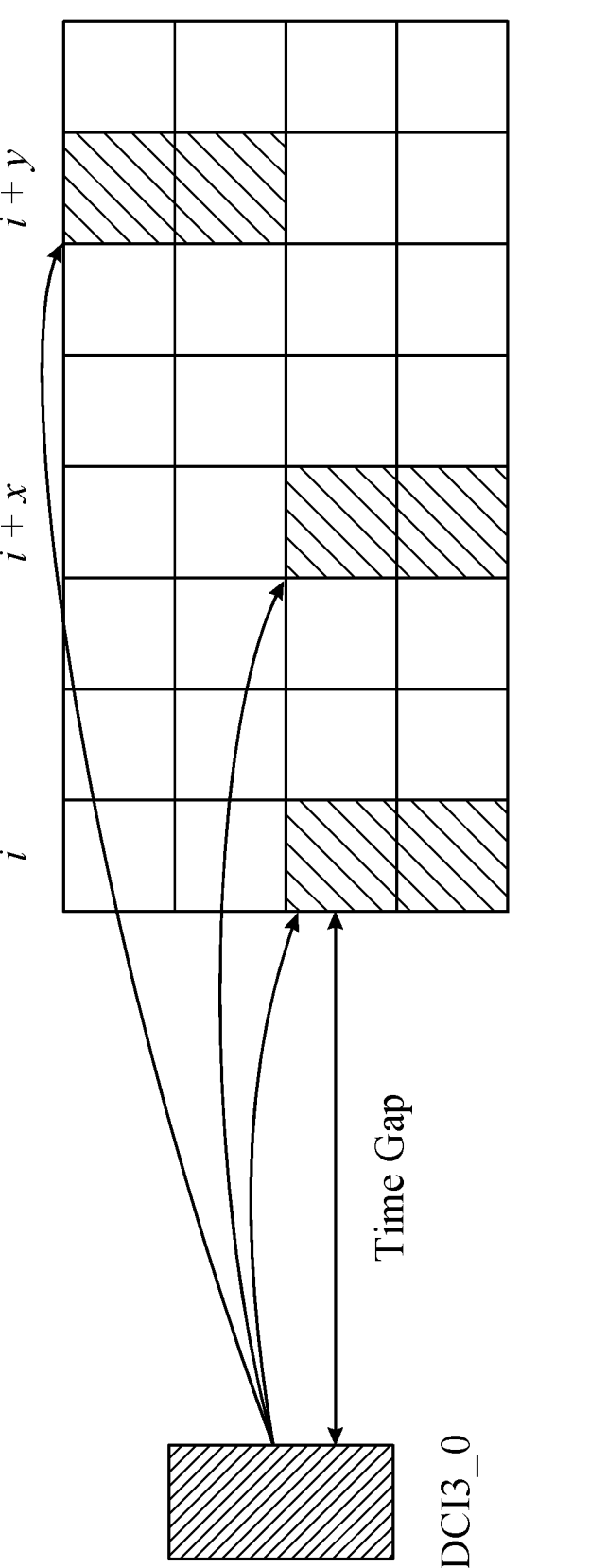
FIG. 8 illustrates an example of sidelink (SL) configuration by downlink control information (DCI), in accordance with certain aspects of the present disclosure.

FIG. 8 illustrates an example of sidelink configuration by downlink control information (DCI), in accordance with certain aspects of the present disclosure. The DCI format 3_0 may be transmitted from a gNB to a UE in range of the gNB. The DCI 3_0 may configure the in-range UE to establish sidelink communications with an out-of-range UE. The DCI 3_0 may include a time gap (e.g., 3 bits by sl-DCI-ToSL-Trans), a HARQ process ID (e.g., 4 bits), a new data indicator (NDI), a lowest index of the sub-channel allocation to the initial transmission, and other information, such as sidelink control information (SCI) format fields that indicate time domain or frequency domain resource allocations, physical sidelink feedback channel (PSFCH) to HARQ feedback timing indicator (sl-PSFCH-ToPUCCH), configuration index or configured grant index, etc. As shown, the DCI may use resources in slot i, i+x, and i+y to activate or release grants (e.g., configured grants).

Figure 9A:
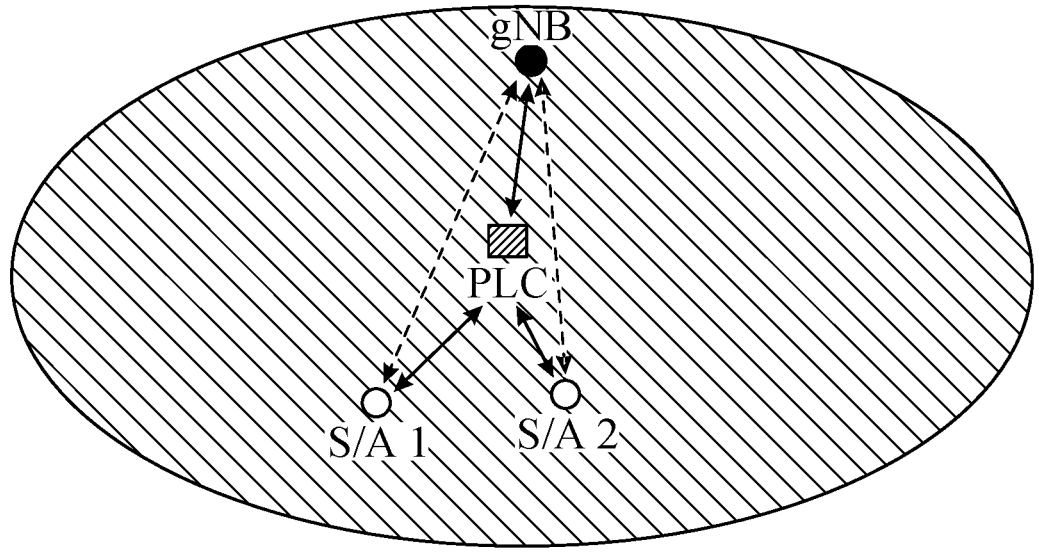
FIGS. 9A and 9B illustrate an example network that includes programmable logical controllers (PLCs)—also known as programmable logic controllers—and sensors and/or actuators (S/As), in accordance with certain aspects of the present disclosure.
Figure 9B:
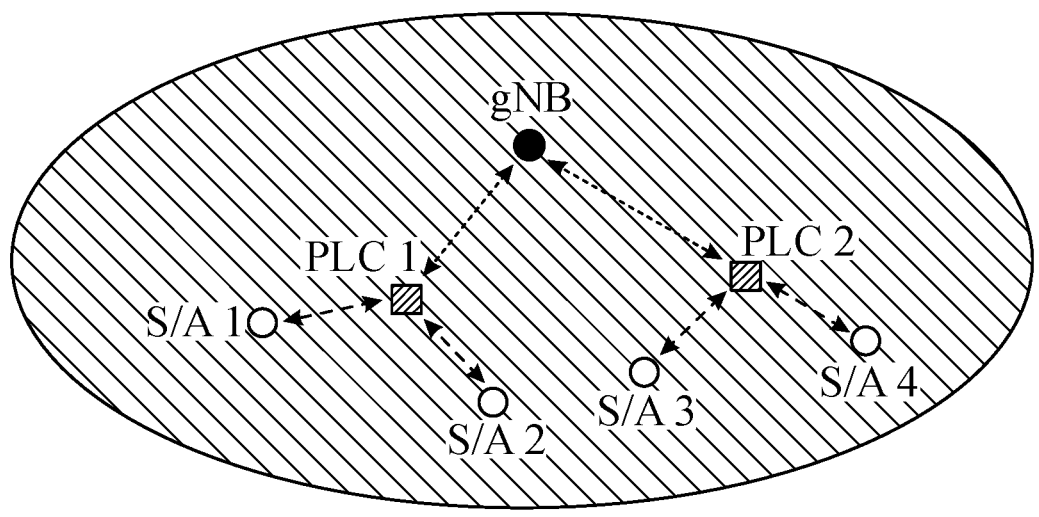

FIGS. 9A and 9B illustrate example network connection configurations that include programmable logical controllers (PLCs) and sensors and/or actuators (S/As), in accordance with certain aspects of the present disclosure. As shown in FIG. 9A, the PLC may communicate with the gNB through a Uu-interface and may communicate with S/A1 and S/A2 through sidelink (PC5) interfaces. In some aspects, the gNB may control not only the PLCs but also the S/As (shown in dotted line) and treat them as a same type of node. Both the PLC and the S/A may be referred to as UEs or sidelink (SL) nodes, whereas the PLC may also be referred to as a special UE, a special sidelink (SL) node, or a network entity (for example, when performing operations for associating an assisting node with one or more sidelink (SL) nodes in accordance with one or more aspects of the present disclosure). In some IIoT applications, the gNB may be ceiling-mounted while the PLCs may be located close to machinery in which the S/As are installed. In one beneficial aspect, such wireless connectivity of the PLC and S/As may significantly reduce reconfiguration costs and time on factory floor. Other IIoT devices may be in the places of the PLC and S/A. In some cases, when the PLC transmits to an actuator, the PLC may be referred to as the transmitter UE or a first UE, and the S/A may be referred to as the receiver UE or a second UE. In some cases, when the PLC receives transmissions from a sensor, the PLC may be referred to as the receiver UE or a second UE, and the S/A may be referred to as the transmitter UE or a first UE. The designation of the transmitter UE and the receiver UE (or the first UE and the second UE) may depend on specific operations and is not bound to a device as a permanent attribute.

FIG. 9B illustrates another example connection configuration of a gNB in communication with two PLCs (PLC1 and PLC2) and multiple S/As, in accordance with one or more aspects of the present disclosure. In some deployments, the number of PLCs and S/As may be scaled up. For example, in an industrial setting (e.g., the IIoT applications mentioned previously), a gNB may be in communication with tens or hundreds of PLCs, each of which may manage or handle hundreds of S/As. The IIoT applications may support URLLC traffic with low latencies (e.g., 1 ms) and ultra-low error rates (e.g., 1E-6 BLER), where the packet size may be small (e.g., a few bytes) and the traffic may be periodic and deterministic. Therefore, sidelink communications may be optimally suited for such settings. Different deployment architectures may be implemented. For example, as shown, when the gNB may not control the S/As directly, but the gNB may primarily communicate with the PLCs that are more capable than the S/As (e.g., the PLCs may have local scheduling capabilities for managing multiple S/As). In some other scenarios (not shown), the PLC and S/A deployment may be without participation of the gNB and rely, for example, on Mode 2 sidelink operations.

Figure 10A:
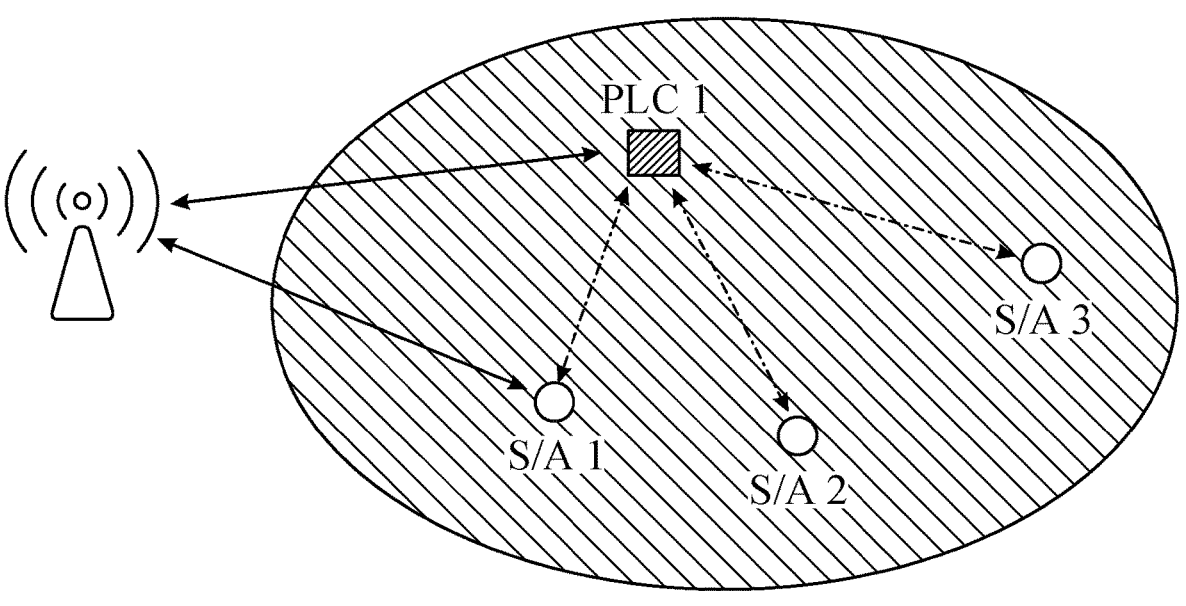
FIGS. 10A and 10B illustrate an example network that includes PLCs and S/As with an assisting node for repeating sidelink (SL) communications, in accordance with certain aspects of the present disclosure.
Figure 10B:
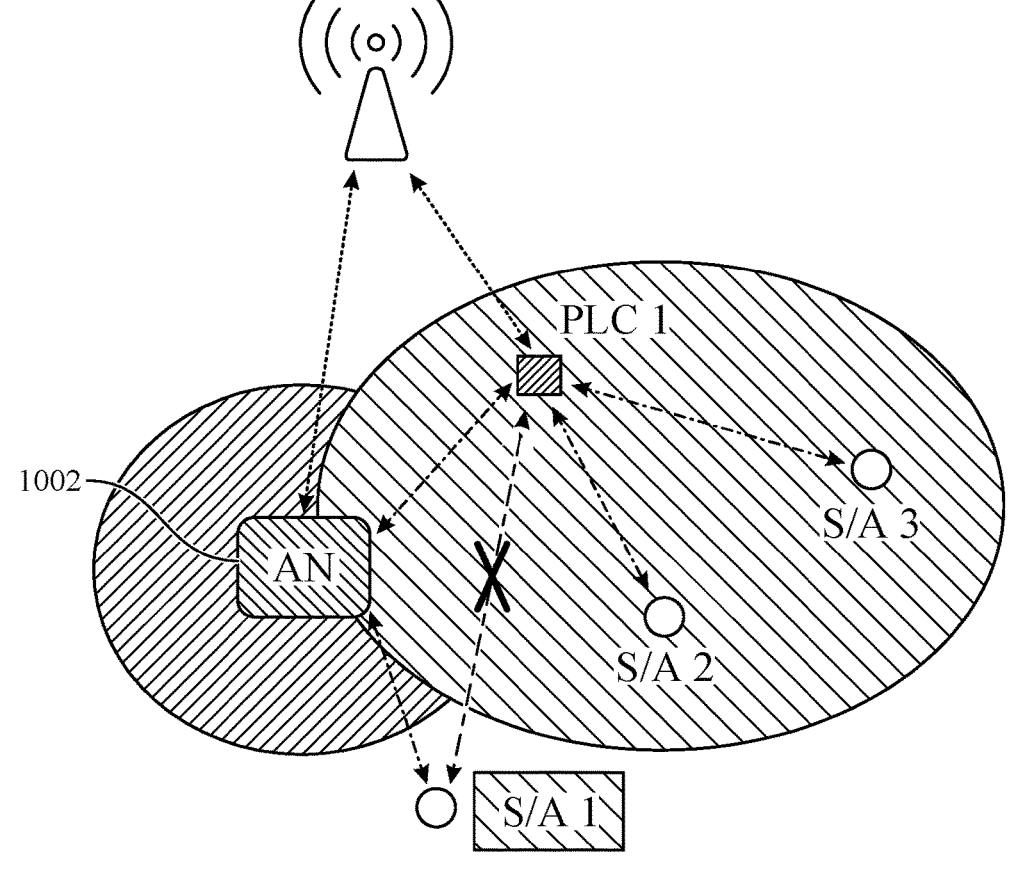

FIGS. 10A and 10B illustrate example network configurations comprising PLCs and S/As, and as shown in FIG. 10B, an assisting node (AN), for repeating sidelink communications in accordance with one or more aspects of the present disclosure.

Referring first to FIG. 10A, a gNB may directly communicate, via Uu interface, with the PLC 1 and S/A 1. Such connection may provide an alternative route if the sidelink between the PLC 1 and S/A 1 becomes unavailable. However, in some cases, multiple-TRP deployment with large numbers of IIoT devices (such as PLC 1 and S/A 1) may incur (prohibitively) high cost for achieving ultra-reliability. In addition, the direct Uu paths may be blocked by obstacles when the PLC 1 and S/A 1 move. The alternative route between the PLC 1 and S/A 1 (via the gNB) may also face high latency issues. As such, the configuration shown in FIG. 10A may provide a useful alternative route in some deployments, but it also may face several serious challenges, including prohibitively high costs or impractical sizes of multi-TRP capability at PLC or SAs and sidelink reliability, e.g., due to the likelihood of sidelink blockage caused by low elevation and dense clutter deployment. To overcome these and other related challenges, an assisting node (AN) with PC5 capability for sidelink repeating operations may be implemented to provide a cost-effective and robust solution, as shown in FIG. 10B.

As shown, FIG. 10B, an assisting node (AN) 1002 may provide sidelink repeating operations for a plurality of IIoT devices. The assisting node (AN), or sidelink repeater (which may also be referred to as a sidelink relay in some examples), may be a smart repeater or reflector for enhancing sidelink reliability between sidelink UEs, such as PLC 1 and S/A 1 as shown. In some cases, the assisting node (AN) may also provide Uu coverage between the gNB and PLC 1 or S/A 1. For sidelink repeating operations, the assisting node may be activated on the sidelink band (e.g., used by the PLC 1 and S/A 1) and associated with the sidelink UEs. When activated, the assisting node communicates with the PLC 1 and S/A 1 in sidelinks, thus ensuring a low latency. In some cases, the assisting node (AN) may be controlled by the gNB and/or PLC 1 functioning as a network entity (e.g., for association, activation, interference management, etc.). Different options may be implemented to provide various control or signaling granularity for the repeating operation by the assisting node (AN) in Mode 1. In some aspects according to the present disclosure, the assisting node (AN) may be configured or signaled by the network entity (e.g., gNB, PLC) in terms of sidelink slots, sidelink resource pool, sidelink operations assignment (e.g., initial transmission or retransmission when activated).

Hereinafter, the term "sidelink" may be used as an adjective to characterize a "node", i.e., "sidelink node" (e.g., the sensor/actuators S/A 1, S/A 2, S/A 3 shown in FIGS. 10A, 10B), or as a noun to denote the connection (e.g., communication link) between two sidelink nodes. When used as a noun, the term "sidelink" may be used interchangeably with "link", "sidelink link", "sidelink connection", "sidelink path".

Example Sidelink Association Operations With Assisting Nodes

FIG. 11 shows a diagram 1100 which illustrates example operations where a network entity 1101 (e.g., gNB, PLC) may associate an assisting node (AN) 1102 with at least one pair of sidelink (SL) nodes (e.g., S/A1 1103 and S/A2 1104) of a plurality of sidelink (SL) nodes. Additionally, or alternatively, the association with the at least one pair of sidelink (SL) nodes may comprise an association with one or more SL links/connections/paths between the at least one pair of SL nodes for efficient repeating scheduling, in accordance with one or more aspects of the present disclosure. In some aspects, the assisting node (AN) 1101 may be the repeater 104 or 490 of FIG. 1 or FIG. 4. It is understood that, in accordance with one or more aspects of the present disclosure, one or more messages, signals or operations illustrated in the diagram 1100 of FIG. 11 may be optional. Additionally, or alternatively, further messages, signals or operations which are not shown may be exchanged between the various entities of FIG. 11.

As illustrated in FIG. 11 and further described in relation with FIG. 16, the network entity 1101 (e.g., gNB, PLC) may determine, at 1125, configuration information relating to one or more control data sets, the one or more control data sets comprising information relating to a plurality of sidelink (SL) nodes. The network entity 1101 may transmit, at 1130, to at least one assisting node (AN) 1102, the configuration information relating to the one or more control data sets. In some aspects, the information relating to the plurality of SL nodes may comprise information relating to at least one SL link between a transmitting (Tx) SL node and a receiving (Rx) SL node (e.g., S/A1 node 1103 and S/A2 node 1104). The one or more control data sets may comprise one or more identifiers (IDs) of the plurality of SL nodes, the at least one SL link, or both.

In some aspects according to the present disclosure, the network entity may transmit, at 1130, RRC messages comprising the one or more control data sets (e.g., RRC SL node list IDs) to the assisting node (AN) 1102. The configuration information relating to the one or more control data sets may be based at least in part on one or more reports (e.g., SL discovery reports, SL link quality reports, etc.), illustrated by messages at 1110, 1115, 1120, which may be received by the network entity 1101 from the assisting node (AN) 1102 and/or the SL nodes (e.g., S/A1 node 1103 and S/A2 node 1104). In addition, or alternatively, according to some aspects, the network entity may also transmit, at 1130, MAC-CE messages to the assisting node (AN) 1102 for activating or deactivating at least one control data set of the one or more control data sets (e.g., SL node list activation). In addition, or alternatively, the network entity 1101 may transmit, at 1130, a DCI indication of activated SL nodes (e.g., DCI may contain an indication pointing to at least one SL node that is activated by MAC-CE). In some examples, a number of bits in DCI used for indicating the SL nodes may vary depending on the total number of activated SL nodes. In related aspects, the RRC, MAC-CE, and/or DCI messages 1130 may further distinguish between SL transmit (SL-Tx) node list and SL receive (SL-Rx) node list.

Correspondingly, the assisting node (AN) 1102 may receive, at 1130, from the network entity 1101 configuration information relating to the one or more control data sets, the one or more control data sets comprising information relating to a plurality of sidelink (SL) nodes (e.g., S/A1 node 1103 and S/A2 node 1104). Based at least in part on the configuration information, received at 1130, the assisting node (AN) 1102) may provide a relay sidelink (SL) link 1145 (e.g., a communication link via the AN 1102, without passing through the network entity 1101) between a transmitting (Tx) SL node (e.g., S/A1 node 1103) and a receiving (Rx) SL node (e.g., S/A2 node 1104) of at least one pair of SL nodes from the plurality of SL nodes, the pair of SL nodes being based at least in part on the configuration information. These and other related aspects of the operations performed by the assisting node (AN) are described in relation with FIG. 15.

With further reference to FIG. 11, one or more sidelink (SL) nodes (e.g., S/A1 node 1103 and S/A2 node 1104) may transmit to the network entity 1101 one or more reports, at 1115 and 1120, and may receive from the network entity 1101, at 1135 and 1140, configuration information based at least on the one or more reports. The one or more reports may comprise at least one of: a sidelink (SL) node discovery report, a sidelink (SL) channel condition measurement report, a quality of service (QoS) requirement for sidelink (SL) traffic, and a buffer status report (BSR). The configuration information may comprise information for the sidelink (SL) node to adjust a beam and/or a precoder towards the at least one assisting node (AN) 1102. In addition, or alternatively, the configuration information may comprise information for the sidelink (SL) node to adjust a beam and/or a precoder towards at least one other sidelink (SL) node. In addition, or alternatively, the configuration information may comprise information for monitoring a group common physical downlink control channel (GC-PDCCH), wherein the GC-PDCCH may comprise information indicating to the sidelink (SL) node to adjust its transmit beam and/or receive beam and/or precoder towards the at least one assisting node (AN) 1102 and/or at least one other sidelink (SL) node. These and other aspects of the operations performed by a sidelink (SL) node are described in relation with FIG. 17.

Figure 12:
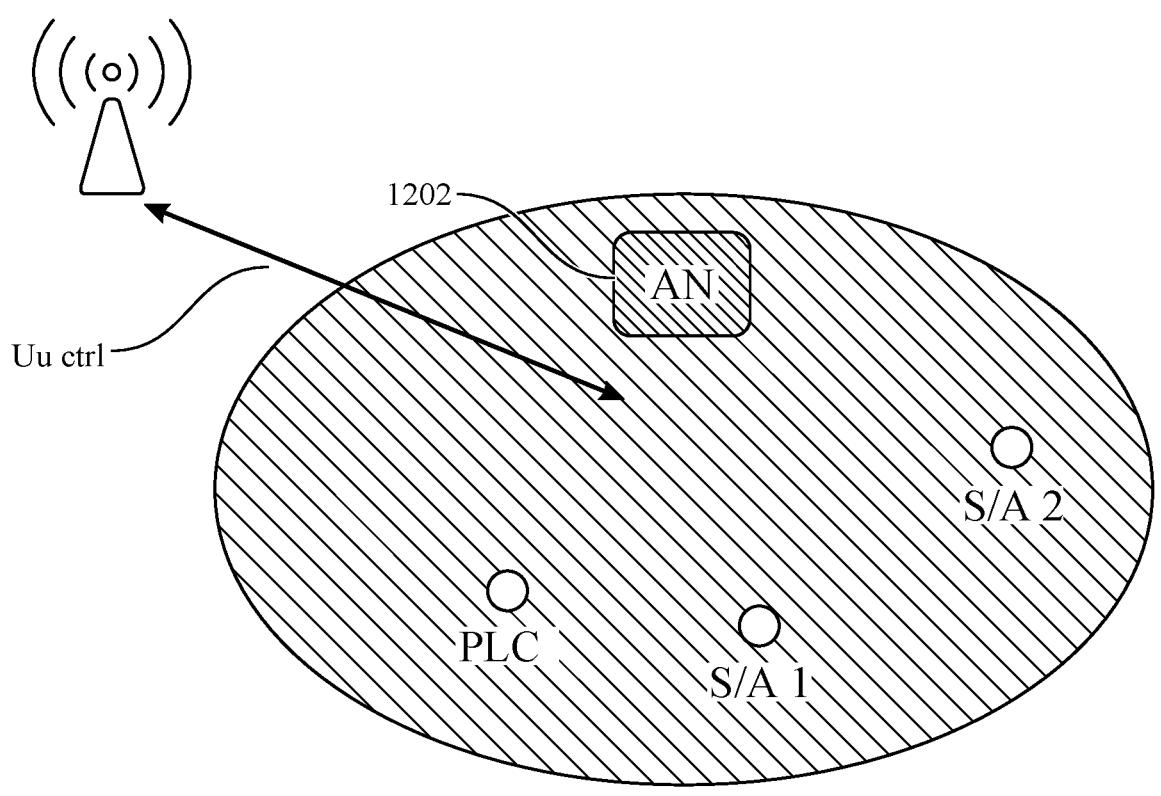
FIG. 12 illustrates an example, where a network entity used a Group Common PDCCH (GC-PDCCH) for sidelink (SL) association and/or scheduling, in accordance with certain aspects of the present disclosure.

FIG. 12 illustrates an aspect, where a network entity uses a group common physical downlink control channel (GC-PDCCH) for sidelink association and/or scheduling, in accordance with one or more aspects of the present disclosure. In some examples, the network entity may be the BS 110 shown in FIG. 1 or FIG. 4. The assisting node (AN) and the sidelink (SL) nodes may be configured to monitor the GC-PDCCH. For example, the assisting node (AN) and the different SL nodes may be configured with different reading positions of the GC-PDCCH. Based on the GC-PDCCH, the assisting node (AN) is notified about the SL-Tx-ID and SL-Rx-ID of the sidelink (SL) nodes it is supposed to assist. In some aspects, the assisting node (AN) may measure sidelink channel state information reference signals (SL-CSI-RS) and/or demodulation reference signals (DMRS) transmitted by the sidelink (SL) node(s) for beam training. Based on the GC-PDCCH, the assisting node (AN) may further be switched ON and/or OFF on indicated sidelink (SL) resources. In some aspects, the transmit power of the assisting node (AN) may be indicated on the GC-PDCCH. In addition or alternatively the assisting node (AN) may be indicated to detect physical sidelink feedback channel (PSFCH), e.g., for dynamic ON/OFF switching for retransmissions. In some other aspects, based on the GC-PDCCH, the SL-Tx node (and/or the SL-Rx node) may adjust its beam and/or precoder towards the SL-Rx node (and/or the SL-Tx node) and/or the assisting node.

Figure 13:
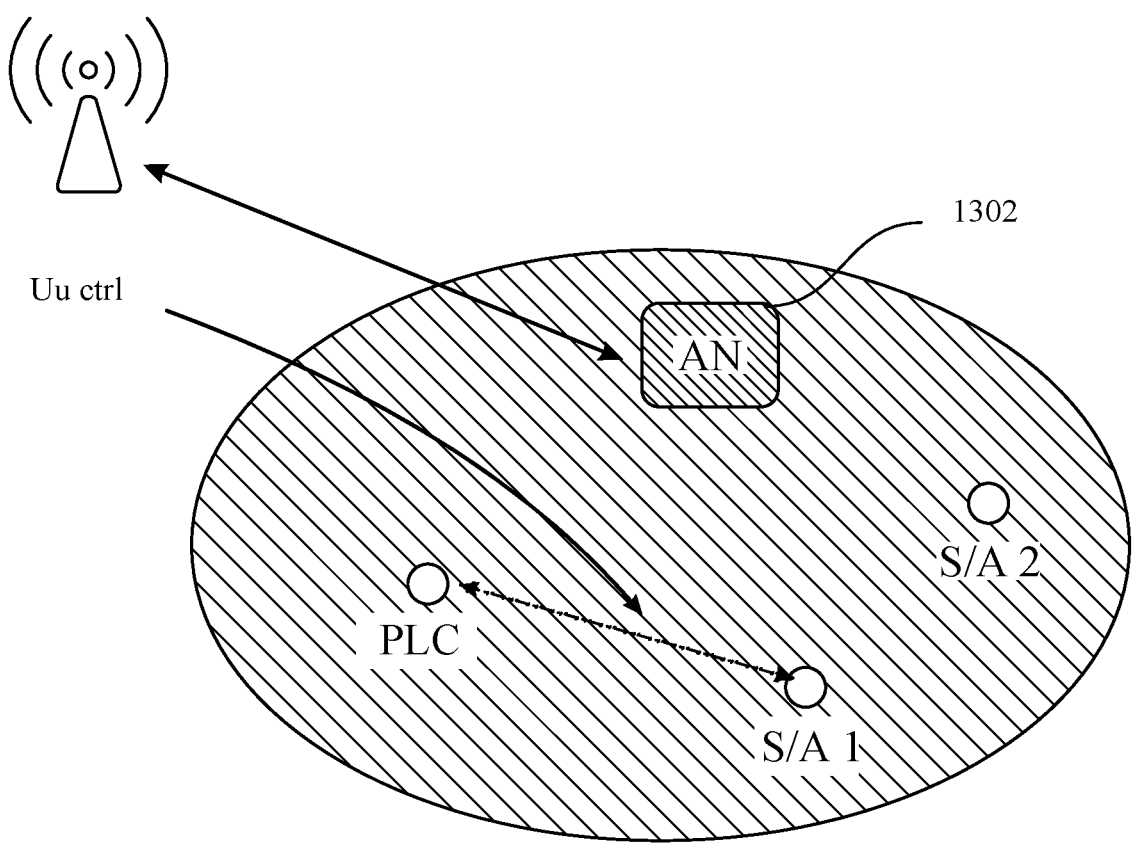
FIG. 13 illustrates an example of associating an assisting node (AN) with one or more sidelink (SL) nodes and/or SL links via Uu signaling from a network entity (e.g., gNB, PLC), in accordance with certain aspects of the present disclosure.

FIG. 13 illustrates an aspect of associating an assisting node (AN) with one or more sidelink (SL) nodes and/or SL links via Uu signaling from a network entity (e.g., gNB, PLC), in accordance with one or more aspects of the present disclosure. In some examples, the network entity may be the BS 110 shown in FIG. 1 or FIG. 4. The Uu signaling to configure the AN's sidelink repeating operations may contain the ID of a particular sidelink (connection) and/or one or more IDs or one or more sidelink (SL) nodes (e.g., Tx and/or Rx sidelink nodes). In some aspects. RRC signaling may configure different lists of SL nodes or SL links (with Tx and Rx sidelink nodes) based on one or more discovery and beam index reports. In some related aspects, MAC-CE may activate one or more of the lists of sidelink (SL) nodes and/or links which the assisting node (AN) may be ready to assist upon DCI signaling. In further related aspects, DCI may signal (e.g., index, index list, bitmap, etc.) one or more sidelink nodes and/or links to be activated (e.g., from the lists activated by MAC-CE) for dynamic sidelink repeating operations. In some examples, the assisting node (AN) may tune its transmit (Tx) and receive (Rx) beams and/or its Tx power to amplify and forward the sidelink transmissions based on the one or more identifiers IDs (e.g., index, index list, bitmap, etc.) of the SL nodes and/or links and/or based on the ON/OFF indication. In related aspects, the sidelink ID (SL-ID) may indicate groupcast or broadcast transmissions where the assisting node (AN) may use a broad beam.

Figure 14:
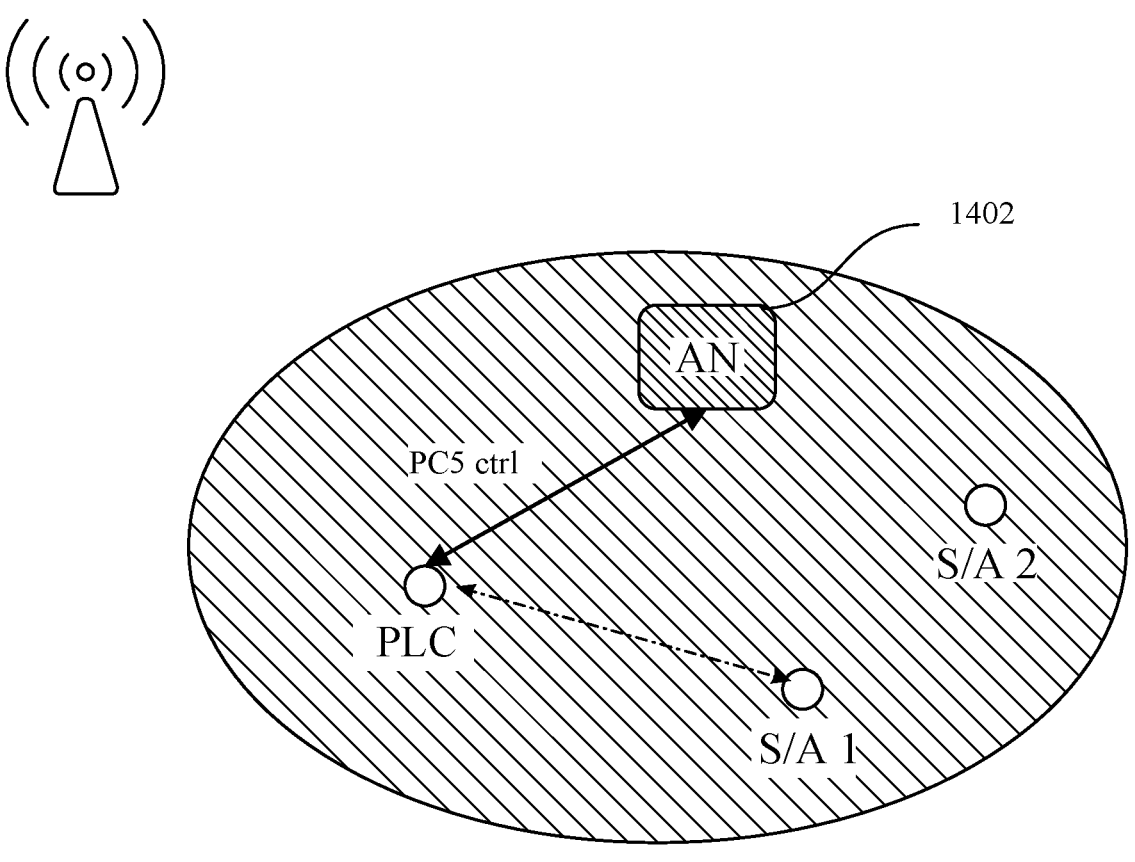
FIG. 14 illustrates an aspect of associating an assisting node with one or more sidelink (SL) nodes and/or sidelink (SL) links via PC5 signaling, in accordance with certain aspects of the present disclosure.

FIG. 14 illustrates an aspect of associating an assisting node (AN) with one or more sidelink (SL) nodes and/or links via PC5 signaling. For example, a gNB may first configure a programmable logical controller (PLC) (e.g., a PLC in star-topology controlling multiple S/As) to act as a network entity (e.g., in lieu of the gNB) for associating the AN with the one or more SL nodes or links for repeating operations in sidelink. The gNB may set maximum transmit (Tx) power for PC5 repeating, which may be beam-specific (e.g., lower transmit power for beam pointing toward gNB and high transmit power for beam pointing away from gNB). In some related aspects, the gNB may still configure the AN for Uu and/or other PC5 repeating operations. The AN may receive PC5 signaling for ON/OFF switching (e.g., activation/deactivation) and beam configuration of its sidelink repeating operations. The AN may transmit feedback (e.g., via PSFCH) to the PLC indicating whether PLC's repeating request is feasible or not (e.g., due to Uu repeating or other restrictions imposed by the gNB). In some aspects. PC5 signaling may include RRC signaling (e.g., periodic activation of the AN, lists of SL nodes, periodic transmission and reception of SL-CSI-RS, channel busy rate (CBR) measurement reporting). Additionally, or alternatively, PC5 signaling may include MAC-CE signaling (e.g., semi-persistent activation of AN, semi-persistent SL-CSI reporting for beam and/or precoder, etc.), and/or sidelink control information (SCI) signaling (e.g., SCI-1 or SCI-2 power control, dynamic ON/OFF switching, etc.).

FIG. 15 shows a flowchart illustrating a first aspect of a method 1500 for wireless communications by an assisting node (AN), in accordance with one or more aspects of the present disclosure. The assisting node (AN) may be embodied, be a part of, or comprise, for example, a smart repeater, a relay, or a reflector configured (and/or configurable) for sidelink (SL) repeating operations in accordance with one or more aspects of the disclosure. At 1502, the assisting node (AN) may receive, from a network entity (e.g., gNB, PLC), configuration information relating to one or more control data sets, the one or more control data sets comprising information relating a plurality of sidelink (SL) nodes. As 1504, the assisting node (AN) may provide a relay sidelink (SL) link via the assisting node (AN) between a transmitting (Tx) SL node and a receiving (Rx) SL node of at least one pair of SL nodes from the plurality of SL nodes, the at least one pair of SL nodes being (e.g., determined) based at least in part on the configuration information (e.g., received from the network entity). Therefore, the relay sidelink (SL) link may help establish an alternative sidelink communication path (which may also be referred to as sidelink link, sidelink path, sidelink connection, etc.) between at least two sidelink nodes via the assisting node. Hence, the assisting node (AN) may be operable to provide an alternative relay sidelink (e.g., without routing via the network entity) between at least one pair of SL nodes from the one or more control data sets (e.g., if a direct SL link between the at least one pair of SL nodes is obstructed or otherwise fails). The network entity (e.g., gNB, PLC) and the assisting node (AN) may correspond to the respective entities illustrated in one or more of the previous figures (e.g., FIGS. 1-14).

In a second aspect, related to the first aspect of the method 1500, the network entity may be a base station, such as a gNB, or a programmable logical controller (PLC). The PLC may be regarded as a network entity when performing the functions described above, or as a special sidelink (SL) node (e.g., a sidelink (SL) node with capabilities for configuring and controlling other sidelink (SL) nodes). In a third aspect, related to one or more of the previous aspects of the method 1500, the information relating to the plurality of SL nodes comprises information relating to at least one SL link between the Tx SL node and the Rx SL node of the at least one pair of SL nodes. In a fourth aspect, related to one or more of the previous aspects of the method 1500, the one or more control data sets may comprise one or more identifiers (IDs) of the one or more sidelink (SL) nodes and/or sidelink (SL) links.

In a fifth aspect, related to one or more of the previous aspects of the method 1500, receiving the configuration information may comprise receiving one or more radio resource control (RRC) messages comprising the one or more control data sets. In a sixth aspect, related to one or more of the previous aspects of the method 1500, the assisting node (AN) may further receive one or more medium access control (MAC) control element (CE), i.e., MAC-CE, messages for activating or deactivating at least one control data set of the one or more control data sets, and may activate or deactivate the at least one control data set of the one or more control data sets based, at least in part, on the one or more MAC-CE messages. In a seventh aspect, related to one or more of the previous aspects of the method 1500, the assisting node (AN) may receive one or more downlink control information (DCI) messages indicating at least one sidelink (SL) node or at least one sidelink (SL) link to be activated or deactivated by the one or more MAC-CE messages, and may activate or deactivate the at least one SL node or the at least one SL link based, at least in part, on the one or more DCI messages. In an eighth aspect, related to one or more of the previous aspects of the method 1500, a number of information bits of the DCI message may be based at least in part on a number of activated sidelink (SL) nodes, a number of activated sidelink (SL) links, or both. In a ninth aspect, related to one or more of the previous aspects of the method 1500, at least one of the one or more RRC, MAC-CE and DCI messages may comprise further assistance information for enabling the assisting node (AN) to distinguish between transmitting (Tx) sidelink (SL) (Tx-SL) nodes and receiving (Rx) sidelink (SL) (Rx-SL) nodes.

In a tenth aspect, related to one or more of the previous aspects of the method 1500, the assisting node (AN) may further transmit, to the network entity, one or more reports, wherein the one or more reports may comprise at least one of a sidelink (SL) node discovery report, a sidelink (SL)

channel measurement report, or an assisting node (AN) capability report (e.g., a capability report of the assisting node concerning the functionality or capability of the assisting node). In an eleventh aspect, related to one or more of the previous aspects of the method 1500, the assisting node (AN) may receive, from the network entity, a triggering message (e.g., a request for the AN) to start measuring sidelink (SL) channel state information reference signals (CSI-RSs) received at the assisting node (AN) from at least one of the plurality of sidelink (SL) nodes for beam pairing, sidelink (SL) channel condition measurement, or both. In a twelfth aspect, related to one or more of the previous aspects of the method 1500, the assisting node (AN) may transmit, to the network entity, a report comprising an index of a best beam towards the at least one of the plurality of sidelink (SL) nodes, one or more reference signal received power (RSRP) measurements from the at least one of the plurality of sidelink (SL) nodes, or both.

In a thirteenth aspect, related to one or more of the previous aspects of the method 1500, receiving the configuration information may comprise receiving, from the network entity, a configuration message for monitoring a group common physical downlink channel (GC-PDCCH). In a fourteenth aspect, related to one or more of the previous aspects of the method 1500, the configuration message may comprise at least one assisting node (AN)—specific reading position of the GC-PDCCH. In a fifteenth aspect, related to one or more of the previous aspects of the method 1500, the GC-PDCCH may comprise configuration information indicating to the assisting node (AN) at least one transmitting (Tx) sidelink (SL) node identifier (Tx-SL-ID) and at least one receiving (Rx) sidelink (SL) node identifier (Rx-SL-ID) of the at least one pair of SL nodes of the plurality of SL nodes for establishing a relay SL link for control signaling, data traffic, or both, based at least in part on the at least one Tx-SL-ID and the at least one Rx-SL-ID. In a sixteenth aspect, related to one or more of the previous aspects of the method 1500, the GC-PDCCH may comprise configuration information indicating to the assisting node (AN) at least one of: switching between ON/OFF operating modes, adjusting a transmit power, or detecting physical sidelink feedback channel (PSFCH) for dynamic ON/OFF for retransmissions.

In a seventeenth aspect, related to one or more of the previous aspects of the method 1500, receiving the configuration information may comprise receiving, from the network entity, the configuration information via Uu signaling, the configuration information comprising one or more identifiers (IDs) relating to the plurality of sidelink (SL) nodes, the at least one sidelink (SL) link, or both. In an eighteenth aspect, related to one or more of the previous aspects of the method 1500, the configuration information may be received via RRC signaling. In a nineteenth aspect, related to one or more of the previous aspects of the method 1500, the configuration information for the AN may comprise one or more transmit (Tx) and receive (Rx) beam parameters.

In a twentieth aspect, related to one or more of the previous aspects of the method 1500, the assisting node (AN) may further receive an association message, the association message comprising information for associating the assisting node (AN) with a special sidelink (SL) node (e.g., a programmable logical controller (PLC)), wherein the special sidelink (SL) node is operable for configuring the assisting node (AN). In a twenty-first aspect, related to one or more of the previous aspects of the method 1500, the special SL node may be part of, or comprise, or embody a programmable logical controller (PLC), wherein the PLC may be arranged in a star-topology (or other known topologies), and wherein the PLC may be operable to control one or more sidelink (SL) nodes, wherein the one or more sidelink (SL) nodes may comprise one or more sensors and actuators (S/As). In a twenty-second aspect, related to one or more of the previous aspects of the method 1500, receiving the configuration information may comprise receiving the configuration information via PC5 signaling. In a twenty-third aspect, related to one or more of the previous aspects of the method 1500, the PC5 signaling may comprise at least one of: radio resource control (RRC) signaling, medium access control (MAC) control element (CE), i.e., MAC-CE, signaling, sidelink control information (SCI) signaling (e.g., SCI-1, SCI-2, or both SCI-1 and SCI-2, signaling). In a twenty-fourth aspect, related to one or more of the previous aspects of the method 1500, the PC5 signaling may comprise radio resource control (RRC) signaling, and the radio resource control (RRC) signaling may comprise at least one of: one or more RRC messages comprising the one or more control data sets (e.g., comprising information related to one or more sidelink (SL) nodes and/or one or more sidelink (SL) links), signaling for periodic activation or deactivation of the assisting node (AN), signaling for periodic transmission (Tx), periodic reception (Rx), or both, of sidelink channel state information reference signals (SL-CSI-RS) reporting and/or channel busy ratio (CBR) reporting. In a twenty-fifth aspect, related to one or more of the previous aspects of the method 1500, the PC5 signaling may comprise medium access control-control element (MAC-CE) signaling, and the MAC-CE signaling may comprise at least one of: signaling for semi-persistent activation of the assisting node (AN), or signaling for semi-persistent sidelink channel state information (SL-CSI) reporting relating to at least one beam and/or at least one precoder. In a twenty-sixth aspect, related to one or more of the previous aspects of the method 1500, the PC5 signaling may comprise sidelink control information (SCI)-1 signaling. SCI-2 signaling, or both SCI-1 and SCI-2 signaling, comprising at least one of signaling relating to power control, or signaling relating to dynamic ON/OFF indication.

FIG. 16 shows a flowchart illustrating a first aspect of a method 1600 for wireless communications by a network entity (e.g. gNB, PLC), in accordance with certain aspects of the present disclosure. At 1602, the network entity may determine configuration information relating to one or more control data sets, the one or more control data sets comprising information relating to a plurality of sidelink (SL) nodes. At 1604, the network entity may transmit, to at least one assisting node (AN), the configuration information relating to the one or more control data sets. The configuration information transmitted at 1604 may correspond to the configuration information received by the assisting node (AN) at step 1502 of the method 1500 illustrated in the flowchart shown in FIG. 15. The network entity (e.g., gNB, PLC) and the assisting node (AN) may correspond to the respective entities described in connection with or illustrated in one or more of the previous figures (e.g., FIGS. 1-15).

In a second aspect, related to the first aspect of the method 1600, the method 1600 may further comprise receiving one or more reports from the at least one assisting node (AN), or from at least one of the plurality of SL nodes, or both: and determining the configuration information relating to the one or more control data sets based, at least in part, on the one or more reports. In a third aspect, related to one or more of the previous aspects of the method 1600, the one or more reports may comprise at least one of: a SL node discovery report, a SL channel condition measurement report, or an AN capability report. In a fourth aspect, related to one or more of the previous aspects of the method 1600, the network entity may be a base station, such as a gNB, or a programmable logical controller (PLC); and the AN may be operable to provide a relay sidelink (SL) link between at least one pair of sidelink (SL) nodes indicated by the information comprised by the one or more control data sets. In a fifth aspect, related to one or more of the previous aspects of the method 1600, the one or more control data sets may comprise one or more identifiers (IDs) of the one or more sidelink (SL) nodes and/or sidelink (SL) links. In a sixth aspect, related to one or more of the previous aspects of the method 1600, transmitting the configuration information may comprise: transmitting one or more radio resource control (RRC) messages comprising the one or more control data sets. In a seventh aspect, related to one or more of the previous aspects of the method 1600, the method may further comprise transmitting one or more medium access control-control element (MAC-CE) messages for activating or deactivating at least one of the one or more control data sets. In an eighth aspect, related to one or more of the previous aspects of the method 1600, the method may further comprise transmitting, to the assisting node (AN), a triggering message to start measuring sidelink (SL) channel state information reference signals (CSI-RSs) from the one or more sidelink (SL) nodes for beam pairing and/or sidelink (SL) channel condition measurement. In a ninth aspect, related to one or more of the previous aspects of the method 1600, the method may further comprise receiving, from the assisting node (AN), a report comprising an index of a best beam towards the one or more sidelink (SL) nodes and/or one or more reference signal received power (RSRP) measurements from the one or more sidelink (SL) nodes.

In a tenth aspect, related to one or more of the previous aspects of the method 1600, transmitting the configuration information may comprise transmitting a configuration message for monitoring a group common physical downlink control channel (GC-PDCCH). In an eleventh aspect, related to one or more of the previous aspects of the method 1600, the configuration message may comprise at least one assisting node (AN)—specific reading position of the GC-PDCCH. In a twelfth aspect, related to one or more of the previous aspects of the method 1600, the GC-PDCCH may comprise configuration information indicating to the assisting node (AN) at least one transmitting (Tx) sidelink (SL) node identifier (Tx-SL-ID) and at least one receiving (Rx) sidelink (SL) node identifier (Rx-SL-ID) for establishing a relay path for control signaling and/or data traffic base at least in part on the at least one Tx-SL-ID and the at least one Rx-SL-ID. In a thirteenth aspect, related to one or more of the previous aspects of the method 1600, the GC-PDCCH may comprise configuration information indicating to the assisting node (AN) at least one of: switching between ON/OFF operating modes, adjusting a transmit power, and detecting physical sidelink feedback channel (PSFCH) for dynamic ON/OFF for retransmissions.

In a fourteenth aspect, related to one or more of the previous aspects of the method 1600, transmitting the configuration information may comprise transmitting, to the assisting node (AN), the configuration information via Uu signaling, the configuration information comprising one or more identifiers (IDs) relating to one or more sidelink (SL) nodes and/one or more sidelink (SL) links. In a fifteenth aspect, related to one or more of the previous aspects of the method 1600, the configuration information may be transmitted via RRC signaling. In a sixteenth aspect, related to one or more of the previous aspects of the method 1600 the configuration information for the assisting node (AN) may comprise one or more transmit (Tx) and receive (Rx) beam parameters.

In a seventeenth aspect, related to one or more of the previous aspects of the method 1600, the method may further comprise transmitting, to the assisting node (AN), an association message, the association message comprising information for associating the assisting node (AN) with a special sidelink (SL) node, wherein the special sidelink (SL) node may be operable for configuring the assisting node (AN). In an eighteenth aspect, related to one or more of the previous aspects of the method 1600, the special sidelink (SL) node may be a programmable logical controller (PLC), wherein the PLC may be arranged in a star-topology (or other known topologies); and wherein the PLC may be operable to control one or more sidelink (SL) nodes, wherein the one or more sidelink (SL) nodes may comprise one or more sensors and actuators (S/As).

In an nineteenth aspect, related to one or more of the previous aspects of the method 1600, transmitting the configuration information may comprise transmitting the configuration information via PC5 signaling. In a twentieth aspect, related to one or more of the previous aspects of the method 1600, the PC5 signaling may comprise one or more of: radio resource control (RRC) signaling; gmedium access control-control element (MAC-CE) signaling; and sidelink control information (SCI)-1 and/or SCI-2 signaling. In a twenty-first aspect, related to one or more of the previous aspects of the method 1600, the RRC signaling may comprise one or more of: one or more radio resource control (RRC) messages comprising the one or more control data sets: signaling for periodic activation or deactivation of the AN; signaling for periodic transmission (Tx) and/or reception (Rx) of sidelink channel state information reference signals (SL-CSI-RS) and/or channel busy ratio (CBR) reporting. In a twenty-second aspect, related to one or more of the previous aspects of the method 1600, the MAC-CE signaling may comprise one or more of: signaling for semi-persistent activation of the AN; signaling for semi-persistent sidelink channel state information (SL-CSI) reporting relating to at least one beam and/or at least one precoder. In a twenty-third aspect, related to one or more of the previous aspects of the method 1600, the SCI-1 and/or SCI-2 signaling may comprise at least one of: signaling relating to power control and dynamic ON/OFF indication.

Additionally, or alternatively, the method 1600 of FIG. 16 may comprise further aspects, steps, or operations, corresponding to (e.g., mirroring) the one or more aspects, steps, or operations, disclosed in relation to the method 1500 of FIG. 15. For example, if the method 1500 for wireless communications by the assisting node (AN) may comprise transmitting information to the network entity, then the method 1600 for wireless communication by the network entity may comprise, correspondingly, receiving said information from the assisting node (AN), and vice versa.

FIG. 17 shows a flowchart illustrating a first aspect of a method 1700 for wireless communications by a sidelink (SL) node, in accordance with one or more aspects of the present disclosure. At 1702, the sidelink node may transmit, to a network entity (e.g., gNB, PLC), one or more reports. At 1704, the SL node may receive, from the network entity, configuration information based at least in part on the one or more reports. The sidelink (SL) node and/or the network entity (e.g., gNB, PLC) may correspond to the respective entities described in connection with or illustrated in one or more of the previous figures (e.g., FIGS. 11-16), or elsewhere in the present disclosure.

In a second aspect, related to the first aspect of the method 1700, the network entity may be a base station, such as a gNB, or a programmable logical controller (PLC). In a third aspect, related to one or more of the previous aspects of the method 1700, the one or more reports may comprise at least one of: a sidelink (SL) node discovery report, a sidelink (SL) channel condition measurement report, a quality of service (QoS) requirement for sidelink (SL) traffic, or a buffer status report (BSR).

In a fourth aspect, related to one or more of the previous aspects of the method 1700, the configuration information may comprise information for the sidelink (SL) node to adjust a beam and/or a precoded towards at least one assisting node (AN). In a fifth aspect related to one or more of the previous aspects of the method 1700, the at least one assisting node (AN) may be operable to provide an alternative sidelink (SL) link (e.g., a repeater/relay sidelink (SL) link, which may also be referred to as sidelink (SL) communication path, etc.) between the sidelink (SL) node and at least one other sidelink (SL) node, in the event that at least one existing sidelink (SL) link between the sidelink (SL) node and the at least one other sidelink (SL) node is obstructed or otherwise fails. In a sixth aspect, related to one or more of the previous aspects of the method 1700, the configuration information may comprise information for the sidelink (SL) node to adjust a beam and/or a precoder towards at least one other sidelink (SL) node (e.g., a sidelink node which is different from the relaying/repeating assisting node).

In a seventh aspect, related to one or more of the previous aspects of the method 1700, the configuration information may comprise information for monitoring a group common physical downlink control channel (GC-PDCCH). In an eighth aspect, related to one or more of the previous aspects of the method 1700, the GC-PDCCH may comprise information indicating to the sidelink (SL) node to adjust its transmit beam and/or receive beam and/or precoder towards at least one assisting node (AN) and/or at least one other sidelink (SL) node.

In a ninth aspect, related to one or more of the previous aspects of the method 1700, the method may further comprise: receiving, from the network entity, a triggering message to start transmitting sidelink channel state information reference signals (SL-CSI-RSs) and/or demodulation reference signals (DMRS). In a tenth aspect, related to one or more of the previous aspects of the method 1700, the sidelink (SL) node may be operable as a sidelink transmit (SL-Tx) node and/or a sidelink receive (SL-Rx) node.

Additionally, or alternatively, the method 1700 of FIG. 17 may comprise further aspects, steps, or operations, corresponding to (e.g., mirroring) the one or more aspects, steps, or operations, disclosed in relation to the method 1500 of FIG. 15, the method 1600 of FIG. 16, or both.

FIG. 18 illustrates an apparatus 1800 for wireless communication at a assisting node (AN), in accordance with certain aspects of the present disclosure. The apparatus 1800 may comprise various hardware, firmware and/or software modules (e.g., corresponding to means-plus-function components), configured to perform the operations of the method 1500 illustrated in FIG. 15 and any related aspects.

The apparatus 1800 may comprise a processing system 1802 coupled to a transceiver 1808. The transceiver 1808 may be configured to transmit and receive signals for the apparatus 1800 via at least one antenna 1810, such as the various signals disclosed herein. The processing system 1802 may be configured to perform processing functions for the apparatus 1800, including processing signals received and/or transmitted by the apparatus 1800. The processing system 1802 comprises at least one processor 1804 coupled to at least one computer-readable memory 1812 via at least one bus 1806.

In some aspects, the at least one computer-readable memory 1812 may be configured to store instructions (e.g., computer-executable code) that, when executed by the at least one processor 1804, cause the at least one processor 1804 to perform the operations illustrated in FIG. 15 and any other related aspects.

The at least one computer-readable memory 1812 may store code 1822 for receiving, from a network entity, configuration information relating to one or more control data sets, the one or more control data sets comprising information relating to a plurality of sidelink (SL) nodes. In addition, the at least one computer-readable memory 1812 may store code 1824 for providing a relay sidelink (SL) link via the assisting node (AN) between a transmitting (Tx) SL node and a receiving (Rx) SL node of the at least one pair of SL nodes from the plurality of SL nodes, the at least one pair of SL nodes being based at least in part of the configuration information.

As shown in FIG. 18, the at least one processor 1804 may comprise circuitry 1832 for receiving, from a network entity (e.g., gNB, PLC) configuration information relating to one or more control data sets, the one or more control data sets comprising information relating to a plurality of sidelink (SL) nodes. In addition, the at least one processor 1804 may comprise circuitry 1834 for providing a relay sidelink (SL) link via the assisting node (AN) between a transmitting (Tx) SL node and a receiving (Rx) SL node of the at least one pair of SL nodes from the plurality of SL nodes, the at least one pair of SL nodes being based at least in part on the configuration information. In some examples, the at least one processor 1804 may further comprise circuitry configured to perform the operations corresponding to any aspects of the method 1500 of FIG. 15.

FIG. 19 illustrates an apparatus 1900 for wireless communication at a network entity (e.g., gNB, PLC), in accordance with certain aspects of the present disclosure. The apparatus 1900 may comprise various hardware, firmware and/or software modules (e.g., corresponding to means-plus-function components), configured to perform the operations of the method illustrated in FIG. 16 and any related aspects.

The apparatus 1900 may comprise a processing system 1902 coupled to a transceiver 1908. The transceiver 1908 may be configured to transmit and receive signals for the apparatus 1900 via at least one antenna 1910, such as the various signals disclosed herein. The processing system 1902 may be configured to perform processing functions for the apparatus 1900, including processing signals received and/or transmitted by the apparatus 1900. The processing system 1902 comprises at least one processor 1904 coupled to at least one computer-readable memory 1912 via at least one bus 1906.

In some aspects, the at least one computer-readable memory 1912 may be configured to store instructions (e.g., computer-executable code) that, when executed by the at least one processor 1904, cause the at least one processor 1904 to perform the operations illustrated in FIG. 16 and any other related aspects of the disclosure.

The at least one computer-readable memory 1912 may store code 1922 for determining configuration information relating to one or more control data sets, the one or more control data sets comprising information relating to a plurality of sidelink (SL) nodes. In addition, the computer-readable memory 1912 may store code 1924 for transmitting, to at least one assisting node (AN), the configuration information relating to the one or more control data sets.

As shown in FIG. 19, the at least one processor 1904 may comprise circuitry 1932 for determining configuration information relating to one or more control data sets, the one or more control data sets comprising information relating to a plurality of sidelink (SL) nodes. The at least one processor 1904 may also comprise circuitry 1934 for transmitting, to at least one assisting node (AN), the configuration information relating to the one or more control data sets. In some examples, the at least one processor 1904 may further comprise circuitry configured to perform the operations corresponding to any related aspects of the method 1600 shown in FIG. 16.

Figure 20:
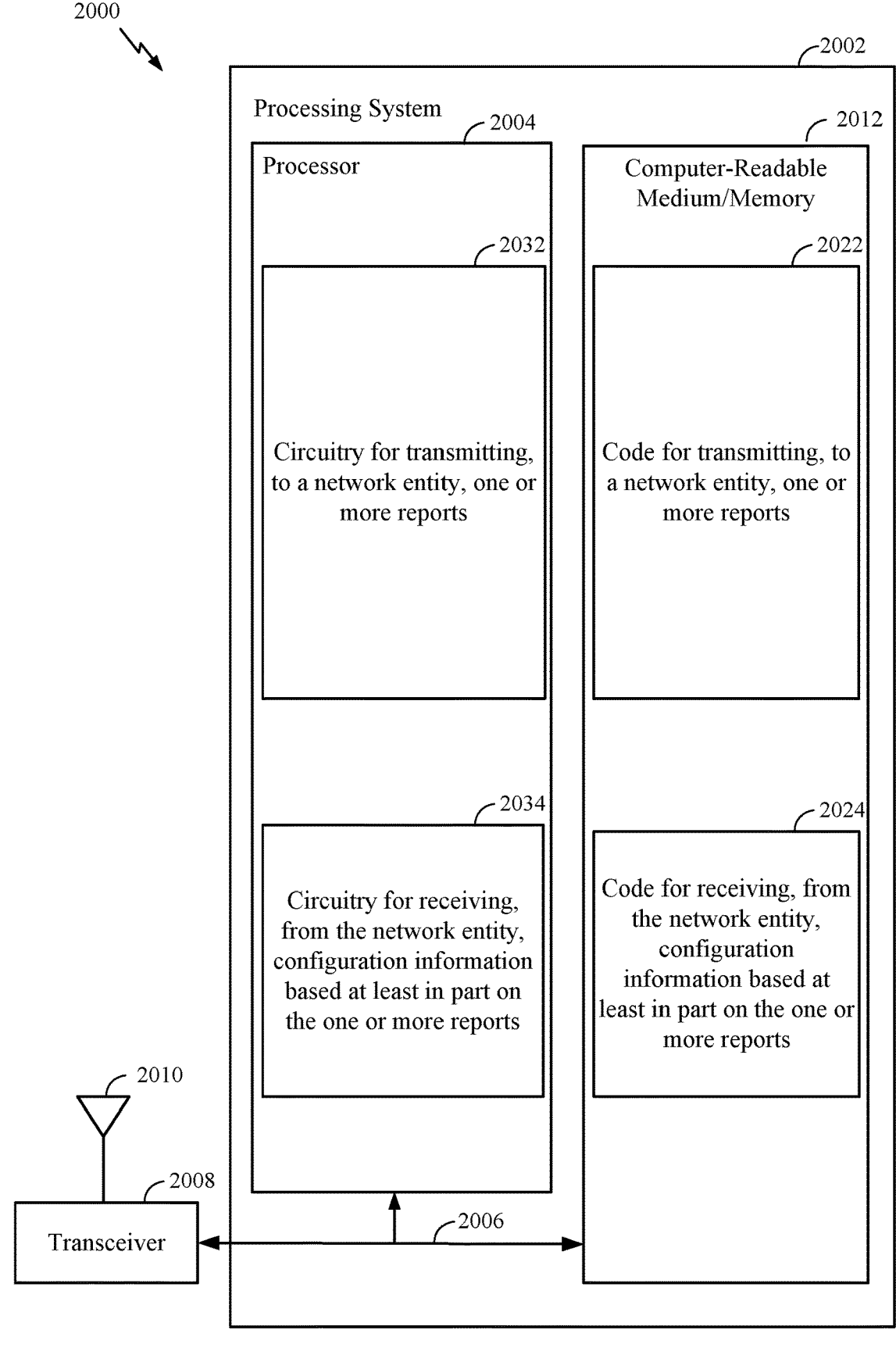
FIG. 20 illustrates an apparatus 2000 for wireless communication at a sidelink (SL) node, in accordance with certain aspects of the present disclosure.

FIG. 20 illustrates an apparatus 2000 for wireless communication at a sidelink (SL) node, in accordance with certain aspects of the present disclosure. The apparatus 2000 may comprise various hardware, firmware and/or software modules (e.g., corresponding to means-plus-function components), configured to perform the operations of the method illustrated in FIG. 17 and any related aspects.

The apparatus 2000 may comprise a processing system 2002 coupled to a transceiver 2008. The transceiver 2008 may be configured to transmit and receive signals for the apparatus 2000 via at least one antenna 2010, such as the various signals disclosed herein. The processing system 2002 may be configured to perform processing functions for the apparatus 2000, including processing signals received and/or transmitted by the apparatus 2000. The processing system 2002 comprises at least one processor 2004 coupled to at least one computer-readable memory 2012 via at least one bus 2006. In some aspects, the at least one computer-readable memory 2012 may be configured to store instructions (e.g., computer-executable code) that, when executed by the at least one processor 2004, cause the at least one processor 2004 to perform the operations illustrated in FIG. 17 and any other related aspects according to the present disclosure.

The at least one computer-readable memory 2012 may store code 2022 for transmitting, to a network entity, one or more reports. For example, the network entity may be embodied as a base station (e.g., a gNB) or as a programmable logical controller (PLC) (which in some aspects may also be considered as a special sidelink (SL) node). In some examples, the one or more reports may comprise at least one of: a sidelink (SL) node discovery report, a sidelink (SL) channel condition measurement report, a quality of service (QoS) requirement for sidelink (SL) traffic, and a buffer status report (BSR).

In addition, the at least one computer-readable memory 2012 may store code 2024 for receiving, from the network entity, configuration information based at least in part on the one or more reports. In some examples, the configuration information may comprise information for the sidelink (SL) node to adjust a beam and/or a precoder towards at least one assisting node (AN) and/or towards at least one other sidelink (SL) node. According to one or more aspects of the disclosure, the at least one assisting node (AN) may be operable to provide an alternative sidelink (SL) link (e.g., sidelink (SL) communication path) between the sidelink (SL) node and at least one other sidelink (SL) node, in the event that at least one existing sidelink (SL) link between the sidelink (SL) node and the at least one other sidelink (SL) node is obstructed or otherwise fails.

As shown in FIG. 20, the at least one processor 2004 may comprise circuitry 2032 for transmitting, to a network entity (e.g., gNB, PLC), one or more reports; and circuitry 2034 for receiving, from the network entity, configuration information based at least in part on the one or more reports. In some examples, the at least one processor 2004 may further comprise circuitry configured to perform the operations corresponding to any related aspects of the method 1700 shown in FIG. 17.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). In addition, or alternatively, the set "a, b, and/or c" may be used interchangeably to refer to "at least one of: a, b, or c".

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described in connection with FIGS. 15-17 as well as any related aspects disclosed herein either explicitly or implicitly for a person skilled in the art.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but they are to be accorded the full scope consistent with the language of the claims, wherein reference to an element in the singular is not intended to mean "one and only one" unless specifically so stated, but rather "one or more". Unless specifically stated otherwise, the term "some" or "set" refers to "one or more". All structural and functional equivalents to the elements of the various aspects described throughout this disclosure are intended to be encompassed by the claims.

Example Aspects

The following provides an overview of various examples illustrating different aspects in accordance with the present disclosure:

Example 1: A method for wireless communication by an assisting node (AN), comprising: receiving, from a network entity, configuration information relating to one or more control data sets, the one or more control data sets comprising information relating to a plurality of sidelink (SL) nodes; and providing a relay sidelink (SL) link via the assisting node (AN) between a transmitting (Tx) SL node and a receiving (Rx) SL node of at least one pair of SL nodes from the plurality of SL nodes, the at least one pair of SL nodes being based at least in part on the configuration information.

Example 2: The method of Example 1, wherein: the network entity is a base station or a programmable logical controller (PLC).

Example 3: The method of Example 1 or Example 2, wherein: the information relating to the plurality of SL nodes comprises information relating to at least one SL link between the Tx SL node and the Rx SL node of the at least one pair of SL nodes.

Example 4: The method of one or more of Examples 1 to 3, wherein: the one or more control data sets comprise one or more identifiers (IDs) of the plurality of SL nodes, the at least one SL link, or both.

Example 5: The method of one or more of Examples 1 to 4, wherein receiving the configuration information comprises: receiving one or more radio resource control (RRC) messages comprising the one or more control data sets.

Example 6: The method of one or more of Examples 1 to 5, further comprising: receiving one or more medium access control-control element (MAC-CE) messages for activating or deactivating at least one control data set of the one or more control data sets; and activating or deactivating the at least one control data set of the one or more control data sets based, at least in part, on the one or more MAC-CE messages.

Example 7: The method of one or more of Examples 1 to 6, further comprising: receiving one or more downlink control information (DCI) messages indicating at least one SL node or at least one SL link to be activated or deactivated by the one or more MAC-CE messages: and activating or deactivating the at least one SL node or the at least one SL link based, at least in part, on the one or more DCI messages.

Example 8: The method of one or more of Examples 1 to 7, wherein: a number of information bits of the DCI message is based, at least in part, on a number of activated SL nodes, a number of activated SL links, or both.

Example 9: The method of one or more of Examples 1 to 8, wherein: at least one of the one or more RRC messages, MAC-CE messages or DCI messages comprises further assistance information for enabling the AN to distinguish between Tx SL nodes and Rx SL nodes.

Example 10: The method of one or more of Examples 1 to 9, further comprising: transmitting, to the network entity, one or more reports, wherein the one or more reports comprise at least one of a SL node discovery report, a SL channel measurement report, or an AN capability report.

Example 11: The method of one or more of Examples 1 to 10, further comprising: receiving, from the network entity, a triggering message to start measuring SL channel state information reference signals (CSI-RSs) received at the AN from at least one of the plurality of SL nodes for beam pairing, SL channel condition measurement, or both.

Example 12: The method of one or more of Examples 1 to 11, further comprising: transmitting, to the network entity, a report comprising an index of a best beam towards the at least one of the plurality of SL nodes, one or more reference signal received power (RSRP) measurements from the at least one of the plurality of SL nodes, or both.

Example 13: The method of one or more of Examples 1 to 12, wherein receiving the configuration information comprises: receiving, from the network entity, a configuration message for monitoring a group common physical downlink control channel (GC-PDCCH).

Example 14: The method of one or more of Examples 1 to 13, wherein: the configuration message comprises at least one assisting node (AN)—specific reading position of the GC-PDCCH.

Example 15: The method of one or more of Examples 1 to 14, wherein: the GC-PDCCH comprises configuration information indicating to the AN at least one Tx SL node identifier (Tx-SL-ID) and at least one Rx SL node identifier (Rx-SL-ID) of the at least one pair of SL nodes of the plurality of SL nodes for establishing a relay SL link for control signaling, data traffic, or both, based at least in part on the at least one Tx-SL-ID and the at least one Rx-SL-ID.

Example 16: The method of one or more of Examples 1 to 15, wherein: the GC-PDCCH comprises configuration information indicating to the AN at least one of switching between ON/OFF operating modes, adjusting a transmit power, or detecting physical sidelink feedback channel (PSFCH) for dynamic ON/OFF for retransmissions.

Example 17: The method of one or more of Examples 1 to 16, wherein receiving the configuration information comprises: receiving, from the network entity, the configuration information via Uu signaling, the configuration information comprising the one or more identifiers (IDs) relating to the plurality of SL nodes, the at least one SL link, or both.

Example 18: The method of one or more of Examples 1 to 17, wherein: the configuration information is received via RRC signaling.

Example 19: The method of one or more of Examples 1 to 18, wherein: the configuration information for the assisting node (AN) comprises one or more transmit (Tx) and receive (Rx) beam parameters.

Example 20: The method of one or more of Examples 1 to 19, further comprising: receiving an association message, the association message comprising information for associating the assisting node (AN) with a special sidelink (SL) node, wherein the special sidelink (SL) node is operable for configuring the assisting node (AN).

Example 21: The method of one or more of Examples 1 to 20, wherein: the special sidelink (SL) node is part of, comprises, or embodies a programmable logical controller (PLC), wherein the PLC is arranged in a star-topology; and wherein the PLC is operable to control one or more sidelink (SL) nodes, wherein the one or more sidelink (SL) nodes comprise one or more sensors and actuators (S/As).

Example 22: The method of one or more of Examples 1 to 21, wherein receiving the configuration information comprises: receiving the configuration information via PC5 signaling.

Example 23: The method of one or more of Examples 1 to 22, wherein the PC5 signaling comprises at least one of: radio resource control (RRC) signaling; medium access control-control element (MAC-CE) signaling; or sidelink control information (SCI)-1 signaling, SCI-2 signaling, or both SCI-1 and SCI-2 signaling.

Example 24: The method of one or more of Examples 1 to 23, wherein the PC5 signaling comprises radio resource control (RRC) signaling, and wherein the RRC signaling comprises at least one of: one or more radio resource control (RRC) messages comprising the one or more control data sets; signaling for periodic activation or deactivation of the AN; signaling for periodic transmission (Tx), periodic reception (Rx), or both, of SL channel state information reference signals (SL-CSI-RS) reporting, channel busy ratio (CBR) reporting, or both SL-CSI-RS and CBR reporting.

Example 25: The method of one or more of Examples 1 to 24, wherein the PC5 signaling comprises medium access control-control element (MAC-CE) signaling, and wherein the MAC-CE signaling comprises at least one of: signaling for semi-persistent activation of the AN; or signaling for semi-persistent sidelink channel state information (SL-CSI) reporting relating to at least one beam and/or at least one precoder.

Example 26: The method of one or more of Examples 1 to 25, wherein the PC5 signaling comprises sidelink control information (SCI)-1 signaling, SCI-2 signaling, or both SCI-1 and SCI-2 signaling, comprising at least one of: signaling relating to power control, or signaling relating to dynamic ON/OFF indication.

Example 27: A method for wireless communication by a network entity, comprising: determining configuration information relating to one or more control data sets, the one or more control data sets comprising information relating to a plurality of sidelink (SL) nodes; and transmitting, to at least one assisting node (AN), the configuration information relating to the one or more control data sets.

Example 28: The method of Example 27, further comprising receiving one or more reports from the at least one AN, or from at least one of the plurality of SL nodes, or both; and determining the configuration information relating to the one or more control data sets based, at least in part, on the one or more reports.

Example 29: The method of Example 28, wherein the one or more reports comprise at least one of: a sidelink (SL) node discovery report, a sidelink (SL) channel condition measurement report, or an assisting node (AN) capability report.

Example 30: The method of one or more of Examples 27 to 29, wherein the network entity is a base station (e.g., a gNB), or a programmable logical controller (PLC); and wherein the assisting node (AN) is operable to provide a relay sidelink (SL) link between at least one pair of sidelink (SL) nodes indicated by the information comprised by the one or more control data sets.

Example 31: The method of one or more of Examples 27 to 30, wherein the one or more control data sets comprise one or more identifiers (IDs) of the one or more sidelink (SL) nodes and/or sidelink (SL) links.

Example 32: The method of one or more of Examples 27 to 31, wherein transmitting the configuration information comprises: transmitting one or more radio resource control (RRC) messages comprising the one or more control data sets.

Example 33: The method of one or more of Examples 27 to 32, further comprising: transmitting one or more medium access control-control element (MAC-CE) messages for activating or deactivating at least one of the one or more control data sets.

Example 34: The method of one or more of Examples 27 to 33, further comprising: transmitting, to the assisting node (AN), a triggering message to start measuring sidelink (SL) channel state information (CSI) reference signals (CSI-RSs) from the one or more sidelink (SL) nodes for beam pairing and/or sidelink (SL) channel condition measurement.

Example 35: The method of one or more of Examples 27 to 34, further comprising: receiving, from the assisting node (AN), a report comprising an index of a best beam towards the one or more sidelink (SL) nodes and/or one or more reference signal received power (RSRP) measurements from the one or more sidelink (SL) nodes.

Example 36: The method of one or more of Examples 27 to 35, wherein transmitting the configuration information comprises: transmitting a configuration message for monitoring a group common physical downlink control channel (GC-PDCCH).

Example 37: The method of one or more of Examples 27 to 36, wherein the configuration message comprises at least one assisting node (AN)—specific reading position of the GC-PDCCH.

Example 38: The method of one or more of Examples 27 to 37, wherein the GC-PDCCH comprises configuration information indicating to the assisting node (AN) at least one transmitting (Tx) sidelink (SL) node identifier (Tx-SL-ID) and at least one receiving (Rx) sidelink (SL) node identifier (Rx-SL-ID) for establishing a relay path for control signaling and/or data traffic based at least in part on the at least one Tx-SL-ID and the at least one Rx-SL-ID.

Example 39: The method of one or more of Examples 27 to 38, wherein the GC-PDCCH comprises configuration information indicating to the assisting node (AN) at least one of: switching between ON/OFF operating modes, adjusting a transmit power, or detecting physical sidelink feedback channel (PSFCH) for dynamic ON/OFF for retransmissions.

Example 40: The method of one or more of Examples 27 to 39, wherein transmitting the configuration information comprises: transmitting, to the assisting node (AN), the configuration information via Uu signaling, the configuration information comprising one or more identifiers (IDs) relating to one or more sidelink (SL) nodes and/one or more sidelink (SL) links.

Example 41: The method of one or more of Examples 27 to 40, wherein the configuration information is transmitted via RRC signaling.

Example 42: The method of one or more of Examples 27 to 41, wherein the configuration information for the assisting node (AN) comprises one or more transmit (Tx) and receive (Rx) beam parameters.

Example 43: The method of one or more of Examples 27 to 42, further comprising: transmitting, to the assisting node (AN), an association message, the association message comprising information for associating the assisting node (AN) with a special sidelink (SL) node, wherein the special sidelink (SL) node is operable for configuring the assisting node (AN).

Example 44: The method of one or more of Examples 27 to 43, wherein the special SL node is a programmable logical controller (PLC), wherein the PLC is arranged in a star-topology: and wherein the PLC is operable to control one or more sidelink (SL) nodes, wherein the one or more sidelink (SL) nodes comprise one or more sensors and actuators (S/As).

Example 45: The method of one or more of Examples 27 to 44, wherein transmitting the configuration information comprises: transmitting the configuration information via PC5 signaling.

Example 46: The method of one or more of Examples 27 to 45, wherein the PC5 signaling comprises one or more of: radio resource control (RRC) signaling; medium access control—control element (MAC-CE) signaling; or sidelink control information (SCI)-1 and/or SCI-2 signaling.

Example 47: The method of one or more of Examples 27 to 46, wherein the RRC signaling comprises one or more of: one or more radio resource control (RRC) messages comprising the one or more control data sets; signaling for periodic activation or deactivation of the AN; signaling for periodic transmission (Tx) and/or reception (Rx) of sidelink (SL) channel state information (CSI) reference signals (SL-CSI-RS) and/or channel busy ratio (CBR) reporting.

Example 48: The method of one or more of Examples 27 to 47, wherein the MAC-CE signaling comprises one or more of: signaling for semi-persistent activation of the assisting node (AN); signaling for semi-persistent sidelink channel state information (SL-CSI) reporting relating to at least one beam and/or at least one precoder.

Example 49: The method of one or more of Examples 27 to 48, wherein the SCI-1 and/or SCI-2 signaling comprises: signaling relating to power control and/or dynamic ON/OFF indication.

Example 50: A method for wireless communication by a sidelink (SL) node, comprising: transmitting, to a network entity, one or more reports; and receiving, from the network entity, configuration information based at least in part on the one or more reports.

Example 51: The method of Example 50, wherein the network entity is a base station (e.g., a gNB) or a programmable logical controller (PLC).

Example 52: The method of Example 50 or Example 51, wherein the one or more reports comprise at least one of: a sidelink (SL) node discovery report, a sidelink (SL) channel condition measurement report, a quality of service (QoS) requirement for sidelink (SL) traffic, or a buffer status report (BSR).

Example 53: The method of one or more of Examples 50 to 52, wherein the configuration information comprises information for the sidelink (SL) node to adjust a beam and/or a precoder towards at least one assisting node (AN).

Example 54: The method of one or more of Examples 50 to 53, wherein the at least one assisting node (AN) is operable to provide an alternative sidelink (SL) link (e.g., a relay sidelink (SL) link, which may also be referred to as sidelink (SL) communication path, etc.) between the sidelink (SL) node and at least one other sidelink (SL) node, in the event that at least one existing sidelink (SL) link between the sidelink (SL) node and the at least one other sidelink (SL) node is obstructed or otherwise fails.

Example 55: The method of one or more of Examples 50 to 54, wherein the configuration information comprises information for the sidelink (SL) node to adjust a beam and/or a precoder towards at least one other sidelink (SL) node.

Example 56: The method of one or more of Examples 50 to 55, wherein the configuration information comprises information for monitoring a group common physical downlink control channel (GC-PDCCH).

Example 57: The method of one or more of Examples 50 to 56, wherein the GC-PDCCH comprises information indicating to the sidelink (SL) node to adjust its transmit beam and/or receive beam and/or precoder towards at least one assisting node (AN) and/or at least one other sidelink (SL) node.

Example 58: The method of one or more of Examples 50 to 57, further comprising: receiving, from the network entity, a triggering message to start transmitting sidelink (SL) channel state information (CSI) reference signals (RS) (SL-CSI-RSs) and/or demodulation reference signals (DMRS).

Example 59: The method of one or more of Examples 50 to 58, wherein the sidelink (SL) node is operable as a sidelink (SL) transmit (Tx) (SL-Tx) node and/or a sidelink (SL) receive (Rx) (SL-Rx) node.

Example 60: An apparatus for wireless communication by an assisting node (AN), comprising: at least one processor; at least one memory module coupled to the at least one processor; and instructions stored in the at least one memory module and executable by the at least one processor to cause the apparatus to: receive, from a network entity, configuration information relating to one or more control data sets, the one or more control data sets comprising information relating a plurality of sidelink (SL) nodes; and provide a relay sidelink (SL) link via the assisting node (AN) between a transmitting (Tx) SL node and a receiving (Rx) SL node of at least one pair of SL nodes from the plurality of SL nodes, the at least one pair of SL nodes being based at least in part on the configuration information.

Example 61: An apparatus for wireless communication by a network entity, comprising: at least one processor; at least one memory module coupled to the at least one processor; and instructions stored in the at least one memory module and executable by the at least one processor to cause the apparatus to: determine configuration information relating to one or more control data sets, the one or more control data sets comprising information relating to a plurality of sidelink (SL) nodes; and transmit, to at least one assisting node (AN), the configuration information relating to the one or more control data sets.

Example 62: An apparatus for wireless communication by a sidelink (SL) node, comprising: at least one processor; at least one memory module coupled to the at least one processor; and instructions stored in the at least one memory module and executable by the at least one processor to cause the apparatus to: transmit, to a network entity, one or more reports; and receive, from the network entity, configuration information based at least in part on the one or more reports.

Example 63: An apparatus for wireless communication by an assisting node (AN) comprising means for carrying out the method of any of Examples 1 to 26.

Example 64: An apparatus for wireless communication by a network entity comprising means for carrying out the method of any of Examples 27 to 49.

Example 65: An apparatus for wireless communication by a sidelink (SL) node comprising means for carrying out the method of any of Examples 50 to 59.

Example 66: A computer program comprising instructions which when the instructions are executed by at least one processor of an apparatus for wireless communication by an assisting node (AN) cause said apparatus to carry out the method of any of Examples 1 to 26.

Example 67: A computer program comprising instructions which when the instructions are executed by at least one processor of an apparatus for wireless communication by a network entity cause said apparatus to carry out the method of any of Examples 27 to 49.

Example 68: A computer program comprising instructions which when the instructions are executed by at least one processor of an apparatus for wireless communication by a sidelink (SL) node cause said apparatus to carry out the method of any of Examples 50 to 59.

The invention claimed is:

1. A method for wireless communication by an assisting node (AN), comprising:

receiving, from a network entity, configuration information relating to one or more control data sets, the one or more control data sets comprising information relating to a plurality of sidelink (SL) nodes;

providing a relay sidelink (SL) link via the assisting node (AN) between a transmitting (Tx) SL node and a receiving (Rx) SL node of at least one pair of SL nodes from the plurality of SL nodes, the at least one pair of SL nodes being based at least in part on the configuration information; and receiving one or more medium access control-control element (MAC-CE) messages for activating or deactivating at least one control data set of the one or more control data sets.

2. The method of claim 1, wherein:
the network entity is a base station or a programmable logical controller (PLC).

3. The method of claim 1, wherein:
the information relating to the plurality of SL nodes comprises information relating to at least one SL link between the Tx SL node and the Rx SL node of the at least one pair of SL nodes.

4. The method of claim 3, wherein:
the one or more control data sets comprise one or more identifiers (IDs) of the plurality of SL nodes, the at least one SL link, or both.

5. The method of claim 1, wherein receiving the configuration information comprises:
receiving one or more radio resource control (RRC) messages comprising the one or more control data sets.

6. The method of claim 1, further comprising:
activating or deactivating the at least one control data set of the one or more control data sets based, at least in part, on the one or more MAC-CE messages.

7. The method of claim 6, further comprising:
receiving one or more downlink control information (DCI) messages indicating at least one SL node or at least one SL link to be activated or deactivated by the one or more MAC-CE messages; and
activating or deactivating the at least one SL node or the at least one SL link based, at least in part, on the one or more DCI messages.

8. The method of claim 7, wherein:
a number of information bits of the DCI message is based, at least in part, on a number of activated SL nodes, a number of activated SL links, or both.

9. The method of claim 5, wherein:
at least one of the one or more RRC messages, MAC-CE messages or DCI messages comprises further assistance information for enabling the AN to distinguish between Tx SL nodes and Rx SL nodes.

10. The method of claim 1, further comprising:
transmitting, to the network entity, one or more reports, wherein the one or more reports comprise at least one of a SL node discovery report, a SL channel measurement report, or an AN capability report.

11. The method of claim 1, further comprising:
receiving, from the network entity, a triggering message to start measuring SL channel state information reference signals (CSI-RSs) received at the AN from at least one of the plurality of SL nodes for beam pairing, SL channel condition measurement, or both.

12. The method of claim 11, further comprising:
transmitting, to the network entity, a report comprising an index of a best beam towards the at least one of the plurality of SL nodes, one or more reference signal received power (RSRP) measurements from the at least one of the plurality of SL nodes, or both.

13. The method of claim 1, wherein receiving the configuration information comprises:
receiving, from the network entity, a configuration message for monitoring a group common physical downlink control channel (GC-PDCCH).

14. The method of claim 13, wherein:
the configuration message comprises at least one AN-specific reading position of the GC-PDCCH.

15. The method of claim 13, wherein:
the GC-PDCCH comprises configuration information indicating to the AN at least one Tx SL node identifier (Tx-SL-ID) and at least one Rx SL node identifier (Rx-SL-ID) of the at least one pair of SL nodes of the plurality of SL nodes for establishing a relay SL link for control signaling, data traffic, or both, based at least in part on the at least one Tx-SL-ID and the at least one Rx-SL-ID.

16. The method of claim 13, wherein:
the GC-PDCCH comprises configuration information indicating to the AN at least one of: switching between ON/OFF operating modes, adjusting a transmit power, or detecting physical sidelink feedback channel (PSFCH) for dynamic ON/OFF for retransmissions.

17. The method of claim 4, wherein receiving the configuration information comprises:
receiving, from the network entity, the configuration information via Uu signaling, the configuration information comprising the one or more identifiers (IDs) relating to the plurality of SL nodes, the at least one SL link, or both.

18. The method of claim 17, wherein:
the configuration information is received via RRC signaling.

19. The method of claim 17, wherein:
the configuration information for the AN comprises one or more transmit (Tx) and receive (Rx) beam parameters.

20. The method of claim 1, further comprising:
receiving an association message, the association message comprising information for associating the AN with a special SL node, wherein the special SL node is operable for configuring the AN.

21. The method of claim 20, wherein:
the special SL node is part of, comprises, or embodies a programmable logical controller (PLC), wherein the PLC is arranged in a star-topology; and
wherein the PLC is operable to control one or more SL nodes, wherein the one or more SL nodes comprise one or more sensors and actuators (S/As).

22. The method of claim 1, wherein receiving the configuration information comprises:
receiving the configuration information via PC5 signaling.

23. The method of claim 22, wherein the PC5 signaling comprises at least one of:
radio resource control (RRC) signaling;
medium access control-control element (MAC-CE) signaling; or
sidelink control information (SCI)-1 signaling, SCI-2 signaling, or both SCI-1 and SCI-2 signaling.

24. The method of claim 22, wherein the PC5 signaling comprises radio resource control (RRC) signaling, and wherein the RRC signaling comprises at least one of:
one or more radio resource control (RRC) messages comprising the one or more control data sets;
signaling for periodic activation or deactivation of the AN; or signaling for periodic transmission (Tx), periodic reception (Rx), or both, of SL channel state information reference signals (SL-CSI-RS) reporting, channel busy ratio (CBR) reporting, or both SL-CSI-RS and CBR reporting.

25. The method of claim 22, wherein the PC5 signaling comprises medium access control-control element (MAC- CE) signaling, and wherein the MAC-CE signaling comprises at least one of:

signaling for semi-persistent activation of the AN; or signaling for semi-persistent sidelink channel state information (SL-CSI) reporting relating to at least one beam and/or at least one precoder.

26. The method of claim 22, wherein the PC5 signaling comprises sidelink control information (SCI)-1 signaling, SCI-2 signaling, or both SCI-1 and SCI-2 signaling, comprising at least one of:

signaling relating to power control, or signaling relating to dynamic ON/OFF indication.

27. An apparatus for wireless communication by an assisting node (AN), comprising:

at least one processor;

at least one memory module coupled to the at least one processor; and instructions stored in the at least one memory module and executable by the at least one processor to cause the apparatus to:

receive, from a network entity, configuration information relating to one or more control data sets, the one or more control data sets comprising information relating a plurality of sidelink (SL) nodes;

provide a relay sidelink (SL) link via the assisting node (AN) between a transmitting (Tx) SL node and a receiving (Rx) SL node of at least one pair of SL nodes from the plurality of SL nodes, the at least one pair of SL nodes being based at least in part on the configuration information; and receive one or more medium access control-control element (MAC-CE) messages for activating or deactivating at least one control data set of the one or more control data sets.

28. The apparatus of claim 27, wherein:

the information relating to the plurality of SL nodes comprises information relating to at least one SL link between the Tx SL node and the Rx SL node of the at least one pair of SL nodes.

29. The apparatus of claim 27, wherein, to receive the configuration information, the instructions are executable by the at least one processor to cause the apparatus to:

receive one or more radio resource control (RRC) messages comprising the one or more control data sets.

30. The apparatus of claim 27, wherein the instructions are executable by the at least one processor to cause the apparatus to:

activate or deactivate the at least one control data set of the one or more control data sets based, at least in part, on the one or more MAC-CE messages.

* * * * *